United States Patent
Lu et al.

(10) Patent No.: US 12,260,121 B2
(45) Date of Patent: Mar. 25, 2025

(54) FLASH MEMORY MECHANISM CAPABLE OF STORING AND RECORDING ACTUAL TRANSMISSION HISTORY INFORMATION OF COMMUNICATION INTERFACE BETWEEN FLASH MEMORY CONTROLLER AND FLASH MEMORY DEVICE

(71) Applicant: Silicon Motion, Inc., Hsinchu County (TW)

(72) Inventors: Tsu-Han Lu, Hsinchu (TW); Hsiao-Chang Yen, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 114 days.

(21) Appl. No.: 18/202,962

(22) Filed: May 29, 2023

(65) Prior Publication Data
US 2024/0402942 A1 Dec. 5, 2024

(51) Int. Cl.
*G06F 3/06* (2006.01)

(52) U.S. Cl.
CPC ............ *G06F 3/0659* (2013.01); *G06F 3/061* (2013.01); *G06F 3/0679* (2013.01)

(58) Field of Classification Search
CPC ...... G06F 3/0659; G06F 3/0679; G06F 3/061; G06F 3/0653
USPC .................................................. 711/154, 103
See application file for complete search history.

(56) References Cited

U.S. PATENT DOCUMENTS

| | | | |
|---|---|---|---|
| 2010/0169548 A1* | 7/2010 | Kanda | G06K 19/07769 711/E12.002 |
| 2012/0166906 A1* | 6/2012 | Nagadomi | H03M 13/2906 714/755 |
| 2018/0239557 A1* | 8/2018 | Yang | G06F 3/0604 |

* cited by examiner

*Primary Examiner* — Hashem Farrokh
(74) *Attorney, Agent, or Firm* — Winston Hsu

(57) ABSTRACT

A method of a flash memory device to be used in a storage device and coupled to a flash memory controller of the storage device through a specific communication interface, the flash memory device comprising an input/output (I/O) control circuit, a command register, an address register, a memory cell array at least having a first plane and a second plane which is different from the first plane, at least one address decoder, and a control circuit having a specific buffer, and the method comprises: buffering command information of a command signal, sent from the flash memory controller and transmitted through the I/O control circuit, into the command register; buffering address information of the command signal, sent from the flash memory controller and transmitted through the I/O control circuit, into the address register; and controlling the specific buffer storing a transmission history information of the specific communication interface.

28 Claims, 16 Drawing Sheets

FLASH MEMORY MECHANISM CAPABLE OF STORING AND RECORDING ACTUAL TRANSMISSION HISTORY INFORMATION OF COMMUNICATION INTERFACE BETWEEN FLASH MEMORY CONTROLLER AND FLASH MEMORY DEVICE

BACKGROUND OF THE INVENTION

1. Field of the Invention

The invention relates to a flash memory storage mechanism/scheme, and more particularly to a flash memory device/controller and corresponding methods.

2. Description of the Prior Art

Generally speaking, a firmware program/component of conventional flash memory controller may issue multiple command signals, and the transmissions and transmission order are handled by the hardware components of the conventional flash memory controller. Thus, the order of issued command signals may be different from the transmission order of the command signals which are actually transmitted on a communication interface between the conventional flash memory controller and a conventional flash memory device since the command signals are respectively issued and handled by the different components. Since nowadays a currently developed clock timing is needed to more fast, error(s) may frequently occur during the actual transmissions of the command signals due to that the timing becomes erroneous or the transmission signal quality of the communication interface becomes poor.

SUMMARY OF THE INVENTION

Therefore one of the objectives of the invention is to provide a flash memory device/controller and corresponding methods to store and record actual transmission history information between the flash memory device and a flash memory controller for debugging and/or for other purposes so as to solve the above-mentioned problems.

According to embodiments of the invention, a flash memory device to be used in a storage device and coupled to a flash memory controller of the storage device through a specific communication interface is disclosed. The flash memory device comprises an input/output (I/O) control circuit, a command register, an address register, a memory cell array, at least one address decoder, and a control circuit. The I/O control circuit is coupled to the flash memory controller through the specific communication interface. The command register is coupled to the I/O control circuit, and is used for buffering command information of a command signal sent from the flash memory controller and transmitted through the I/O control circuit. The address register is coupled to the I/O control circuit, and is arranged for buffering address information of the command signal sent from the flash memory controller and transmitted through the I/O control circuit. The memory cell array at least has a first plane and a second plane which is different from the first plane. The at least one address decoder is coupled to the memory cell array. The control circuit has a specific buffer, and is coupled to the I/O control circuit, the memory cell array, the address register, and the command register. The control circuit is arranged to control the specific buffer storing a transmission history information of the specific communication interface, and the transmission history information comprises at least one of a data content and a data type of the command information buffered in the command register, a data content and a data type of the address information buffered in the address register, and a data type of a data input/output operation executed by the flash memory device.

According to the embodiments, a method of a flash memory device is disclosed. The flash memory device is to be used in a storage device and coupled to a flash memory controller of the storage device through a specific communication interface, and the flash memory device comprises an input/output (I/O) control circuit, a command register, an address register, a memory cell array at least having a first plane and a second plane which is different from the first plane, at least one address decoder, and a control circuit having a specific buffer. The method comprises: buffering command information of a command signal, sent from the flash memory controller and transmitted through the I/O control circuit, into the command register; buffering address information of the command signal, sent from the flash memory controller and transmitted through the I/O control circuit, into the address register; and, controlling the specific buffer storing a transmission history information of the specific communication interface; the transmission history information comprises at least one of a data content and a data type of the command information buffered in the command register, a data content and a data type of the address information buffered in the address register, and a data type of a data input/output operation executed by the flash memory device.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution, storage device, and method capable of storing and recording the actual transmission history information (excluding accessed data of storage unit(s) of a flash memory device) of a specific communication interface between a flash memory controller and the flash memory device externally coupled to the flash memory controller through the specific communication interface. That is, the provided method can store and record the actual behavior of the flash memory controller, and the behavior information can be recorded and stored by the flash memory device or by the flash memory controller itself. For example, this provided method can be used to record the actual values and actual sequence of the command/address data sent from the flash memory controller into the flash memory device.

Figure 1:
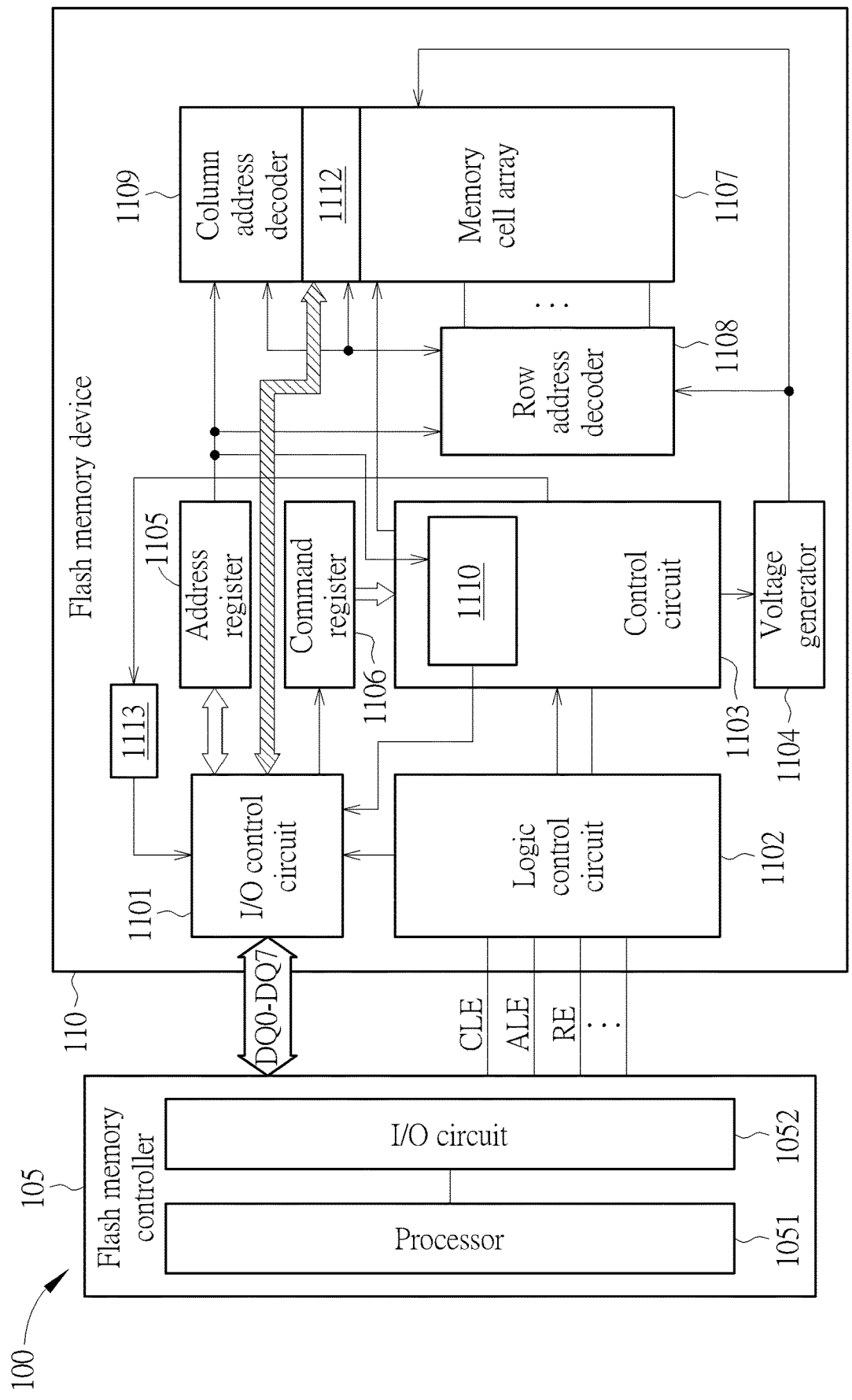
FIG. 1 is a diagram of an example of a storage device comprising a flash memory controller and a flash memory device such as an NAND-type flash memory device including multiples chips/dies according to an embodiment of the invention.

FIG. 1 is a diagram of an example of a storage device 100 comprising a flash memory controller 105 and a flash memory device 110 such as an NAND-type flash memory device including multiples chips/dies according to an embodiment of the invention.

The flash memory controller 105 at least comprises a processor 1051 and an input/output (I/O) circuit 1052. The processor 1051 is coupled to the I/O circuit 1052 and is arranged to control the I/O circuit 1052 sending access (e.g. read, write/program, cache program, or erase) command signals/sequences through a specific communication interface to the flash memory device 110 to control and access the flash memory device 110.

The flash memory device 110 comprises an I/O control circuit 1101, a logic control circuit 1102, a control circuit 1103, a voltage generator 1104 such as a high-voltage generator (but not limited), an address register 1105, a command register 1106, a memory cell array 1107, a row address decoder 1108, a column address decoder 1109, a specific buffer 1110 disposed in and controlled by the control circuit 1103, a data register 1112 disposed between the column address decoder 1109 and memory cell array 1107, and a status register 1113.

The flash memory controller 105 is coupled to the flash memory device 110 through the specific communication interface and controls or accesses the flash memory device 110 by sending one or more commands into the flash memory device 110. The specific communication interface for example comprises at least signal ports/pins such as data pins DQ0-DQ7 or other data pins (not shown in FIG. 1), and logic control pins such as CLE (Command Latch Enable), ALE (Address Latch Enable), RE (Read Enable), and other logical control pins. The data pins DQ0-DQ7 are coupled to the I/O control circuit 1101, and the logic control pins are coupled to the logic control circuit 1102. The memory cell array 1107 has two or more planes (not shown in FIG. 1).

In practice, when the flash memory controller 105 sends command data of a command signal, the flash memory controller 105 controls the signal of the pin ALE at a low level and controls the signal of the pin CLE at a high level so that the flash memory device 110 can know that the data received via the pins DQ0-DQ7 is command data and then can store the received command data into the command register 1106 through the I/O control circuit 1101. Similarly, when the flash memory controller 105 sends address data of the command signal, the flash memory controller 105 controls the signal of the pin ALE at the high level and controls the signal of the pin CLE at the low level so that the flash memory device 110 can know that the data received via the pins DQ0-DQ7 is address data and then can store the received address data into the address register 1105 through the I/O control circuit 1101. The operations associated with the pin RE and/or other pins (not shown in FIG. 1) are not detailed for brevity. Further, when the flash memory controller 105 sends storage data (e.g. sector/page/block/plane data) of the command signal such as a write command signal, the flash memory controller 105 may control the signal of the pin ALE at the low level and control the signal of the pin CLE at the low level so that the flash memory device 110 can know that the data received via the pins DQ0-DQ7 is the storage data and is stored by the I/O control circuit 1101 and then transferred into the data register 1112 so that the transferred storage data then can be moved from the data register 1112 into one or more sectors/pages/blocks/planes. Similarly, if the command signal is a read command signal, then the corresponding storage data (e.g. sector/page/block/plane data) is transmitted from the corresponding one or more sectors/pages/blocks/planes into the data register 1112 and then transmitted into the I/O control circuit 1101 so that the transmitted storage data then can be transmitted into the flash memory controller 105.

In addition, the control circuit 1103 can control the voltage generator 1104 to output different voltage levels to the row address decoder 1108 and the column address decoder 1109 so that the row address decoder 1108 and the column address decoder 1109 can control the memory cell array 1107 performing a program operation, a cache program operation, or an erase operation according to the voltage levels, the received address(es) buffered by the address register 1105, and the received command(s) buffered by the command register 1106. In addition, in the embodiment, control circuit 1103 can control the voltage generator 1104 outputting different voltage levels in response to a backup operation triggered by a backup command signal received from the flash memory controller 105.

The control circuit 1103 is arranged to control the buffer 1110 storing and buffering the behavior history information of the flash memory controller 105, e.g. the command/address data of one or more command signal and/or the corresponding operations actually executed by the flash memory device 110. For example, the buffer 1110 stores the information (i.e. the actual transmission history information excluding data of storage units) each time when the flash memory device 110 currently and actually receives the information from the flash memory controller 105. In this example, the address data buffered in the address register 1105 can be moved and stored into the buffer 1110, and similarly the command data buffered in the command register 1106 can be also moved and stored into the buffer 1110. Once the flash memory controller 105 requests the data content stored in the buffer 1110, a copy of the whole data content stored in the buffer 1110 can be transferred to the I/O control circuit 1101 and then transmitted to the flash memory controller 105 through the communication interface.

In practice, the buffer 1110 for example (but not limited) includes the storage space of 4 KB (the tailing 'KB' indicates the size of one thousand data bytes), and the control circuit 1103 controls the buffer 1110 using a specific storage format to record the actual content value of each behavior information and to record the type of the each behavior information. The specific storage format for example is a data word having two data bytes, i.e. 2B (the tailing 'B' indicates the size of a data byte). The data bytes initially are configured as 00h wherein the tailing 'h' means that the value is a hexadecimal value. The data word has a first byte and a second byte in which the first byte is used to record the actual content value and the second byte is used to record the type. For example, the second byte of the data word can be used to store or indicate the type of the currently occurred behavior information, and it may be (or comprises) a command type (i.e. CLE), an address type (i.e. ALE), a data-in type (from a host device to the flash memory device 110), or a data-out type (from the flash memory device 110 to the host device). For example (but not limited), the second byte is configured as 01h if the type is the command type CLE, is configured as 02h if the type is the address type ALE, is configured as 03h if the type is the data-in type, and it configured as 04h if the type is the data-out type. In addition, the first byte of the data word can be used to store/indicate the actual content value of a currently received command signal if the type indicates CLE, store/indicate the actual content value of a currently received address if the type indicates ALE, store/indicate an initial value such as 00h if the type of currently received information indicates data-in, and store/indicate an initial value such as 00h if the type of currently received information indicates data-out. The following table shows the example of the format of a data word in the buffer 1110:

| Second byte (Byte1) | First byte (Byte0) |
| --- | --- |
| 01h | CLE value |
| 02h | ALE value |
| 03h | 00h (initial value) |
| 04h | 00h (initial value) |

The initial value of the first byte Byte0 can be configured as 00h, and the value of the first byte Byte0 is 00h if the second byte indicates the data-in type such as 03h or the data-out type such as 04h. The value of the first byte Byte0 can be set as the command value if the second byte Byte1 indicates the command type such as 01h, and the value of the first byte Byte0 can be set as the address value if the second byte Byte1 indicates the address type such as 02h.

Figure 2:
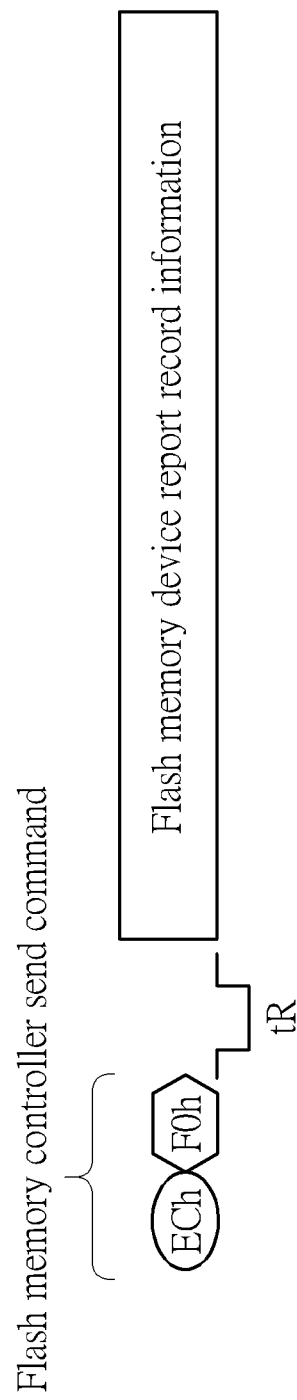
FIG. 2 is a diagram of an example of the flash memory controller sending a specific read record command signal into the flash memory device through the specific communication interface according to one embodiment of the invention.

To request the data stored in the buffer 1110, the flash memory controller 105 may issue and send a specific read record command signal. FIG. 2 is a diagram of an example of the flash memory controller 105 sending a specific read record command signal into the flash memory device 110 through the specific communication interface according to one embodiment of the invention. In FIG. 2, the specific read record command signal for example sequentially comprises a read parameter command such as ECh (but not limited) and a read record address such as F0h (but not limited). When receiving the read parameter command ECh and the read record address F0h, the flash memory device 110 can know that the specific read record command signal is currently received and it is used to trigger or make the flash memory device 110 return and transmit the data information stored in the specific buffer 1110 to the flash memory controller 105 through the specific communication interface, i.e. transmitting the data contents of one or more data words in the buffer 1110.

The time tR means the time period of the control circuit 1103 transferring the data information of the specific buffer 1110 into the I/O control circuit 1101. Thus, after tR, the flash memory device 110 can transmit the data information of the specific buffer 1110 from the I/O control circuit 1101 into the flash memory controller 105 through the communication interface such as pins DQ0-DQ7. In this embodiment, the flash memory device 110 can transmit one copy or more copies of the data information of the specific buffer 1110 into the flash memory controller 105 and/or it can transmit one copy or more copies of an inverted version of the data information of the specific buffer 1110 into the flash memory controller 105. For example (but not limited), the flash memory device 110 can transmit at least one set of one copy of the data information of the specific buffer 1110 and one copy of the corresponding inverted version. For example, the size of the specific buffer 1110 is equal to 4 KB, and the flash memory device 110 sequentially transmits the specific buffer's 1110 original data content 4 KB, inverted data content 4 KB, original data content 4 KB, and inverted data content 4 KB to the flash memory controller 105; the operations will be explained later.

Figure 3:
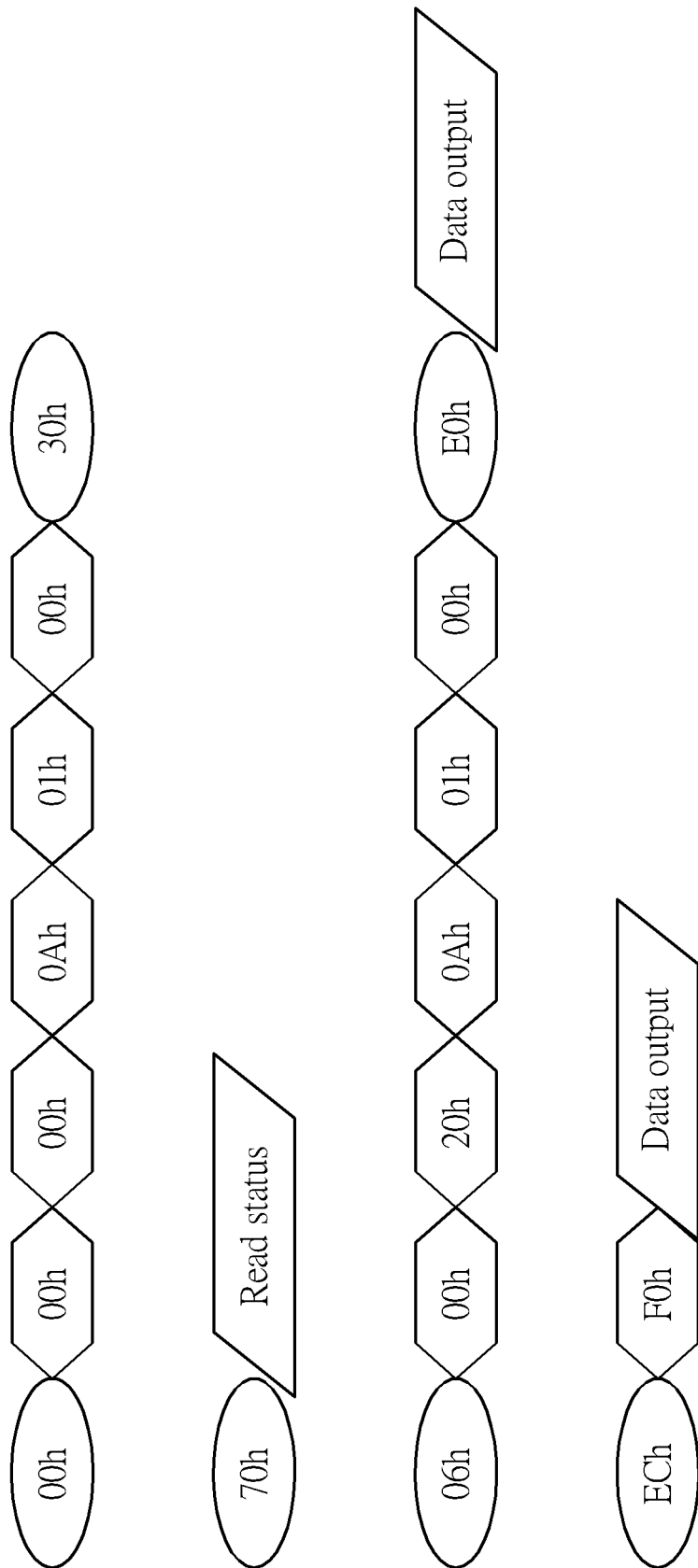
FIG. 3 is a diagram of an example of the flash memory controller sending different command sequences/signals according to one embodiment of the invention.

FIG. 3 is a diagram of an example of the flash memory controller 105 sending different command sequences/signals according to one embodiment of the invention. In FIG. 3, the flash memory controller 105 for example sequentially and respectively sends four command sequences/signals. A first command signal sequentially comprises a data output command such as a read command 00h (not limited), an address information, and a corresponding confirm command such as a read confirm command 30h (not limited), wherein the address information for example includes a row address and a column address to be accessed, and it for example sequentially comprises the values of 00h, 00h, 0Ah, 01h, and 00h. A second command signal comprises a read status command such as 70h, and in this example the read status operation of the flash memory device 110, involves of outputting the status of the flash memory device 110 to the flash memory controller 105, is instantly performed after the second command signal is received. A third command signal sequentially comprises another read command such as change read command 06h, an address information, and another corresponding confirm command such as a change read confirm command E0h (not limited), wherein the address information includes a row address and a column address to be accessed, and it for example sequentially comprises the values of 00h, 20h, 0Ah, 01h, and 00h. In this example, the data output operation of the flash memory device 110, involves of the third command signal sent by the flash memory controller 105, is instantly performed after the third command signal is received. A fourth command signal sequentially comprises a read parameter command such as ECh (but not limited) and a read record address such as F0h (but not limited), and a data output operation of the flash memory device 110, involves of outputting the record information of the flash memory device 110 to the flash memory controller 105, is instantly performed after the fourth command signal is received.

Correspondingly, in response to that each command signal mentioned above is received and the operations are performed, the control circuit 1103 of the flash memory device 110 is arranged to make a record of the each received command signal and the performed operation in the specific buffer 1110 so as to store the transmission behavior occurring in the specific communication interface.

Figure 4:
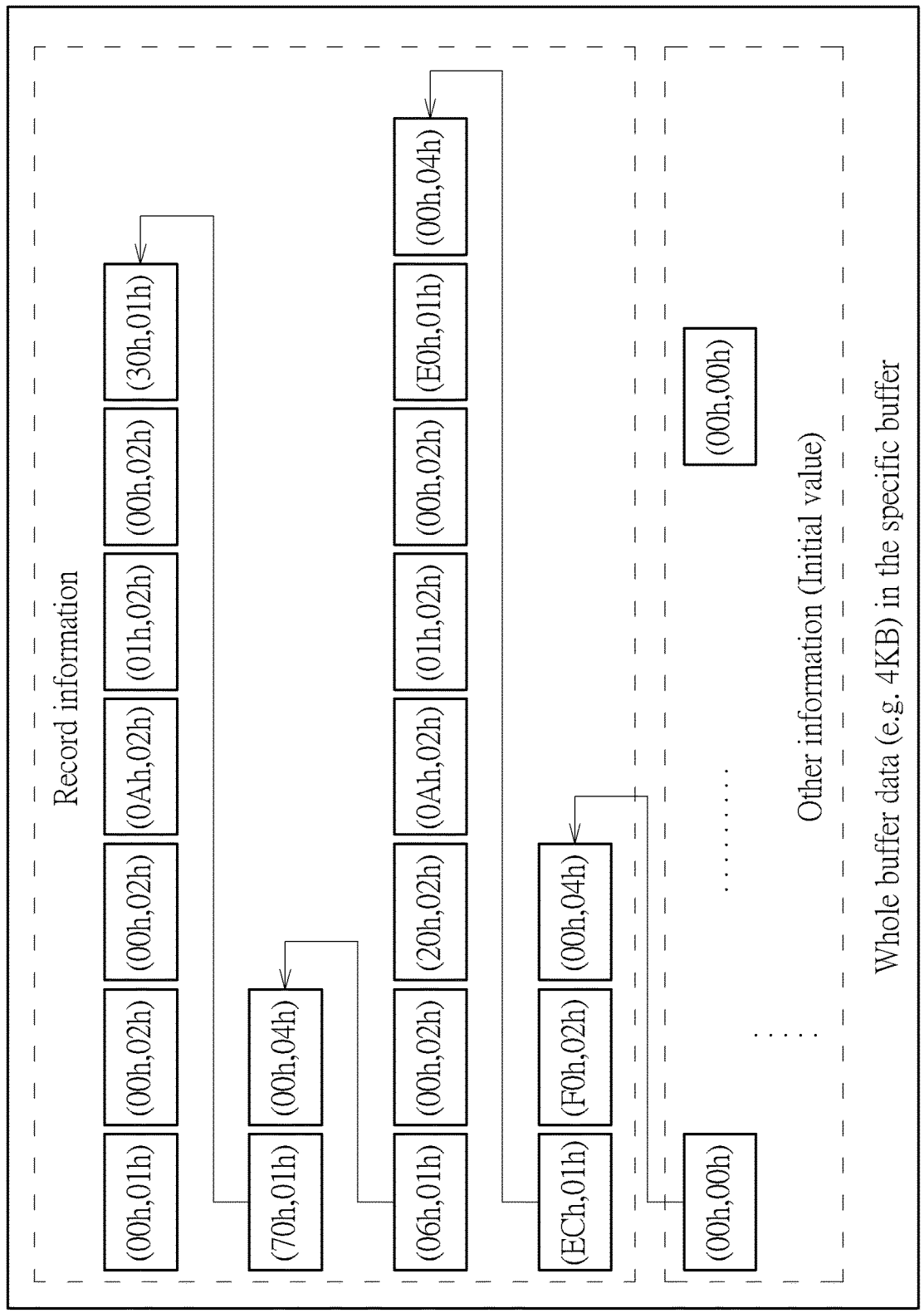
FIG. 4 is a diagram of an example of data information stored in the specific buffer of the flash memory device according to the embodiment shown in FIG. 3.

FIG. 4 is a diagram of an example of data information stored in the specific buffer 1110 of the flash memory device 110 according to the embodiment shown in FIG. 3. The information of the four command signals in FIG. 3 are sequentially and respectively stored in the buffer 1110 step by step. For example, after receiving the first command signal, the control circuit 1103 makes a record of the first command signal in the specific buffer 1110, so that the specific buffer 1110 may sequentially store seven data words (i.e. the data words in the first row of the record information in FIG. 4) in which a first data word (00h, 01h) includes a first byte 00h to store the value of the received read command 00h and a second byte 01h to store and indicate that the received value/information is associated with the command type, a second data word (00h, 02h) following the first data word (00h, 01h) includes a first byte 00h to store the value of first address byte of the received address information and a second byte 02h to store and indicate that the received value/information is associated with the address type, a third data word (00h, 02h) following the second data word (00h, 02h) includes a first byte 00h to store the value of second address byte of the received address information and a second byte 02h to store and indicate that the received value/information is associated with the address type, a fourth data word (0Ah, 02h) following the third data word (00h, 02h) includes a first byte 0Ah to store the value of third address byte of the received address information and a second byte 02h to indicate that the received value/information is associated with the address type, a fifth data word (01h, 02h) following the fourth data word (Ah, 02h) includes a first byte 01h to store the value of fourth address byte of the received address information and a second byte 02h to store and indicate that the received value/information is associated with the address type, a sixth data word (00h, 02h) following the fifth data word (01h, 02h) includes a first byte 00h to store the value of fifth address byte of the received address information and a second byte 02h to store and indicate that the received value/information is associated with the address type, and a seventh data word (30h, 01h) following the sixth data word (00h, 02h) includes a first byte 30h to store the value of the received read confirm command and a second byte 01h to store and indicate that the received value/information is associated with the command type.

Similarly, after receiving the second command signal and the corresponding read status operation is performed, the control circuit 1103 makes a record in the specific buffer 1110 and the record follows the record of the first command signal, so that the specific buffer 1110 may sequentially store two data words (i.e. the data words in the second row of the record information in FIG. 4) in which a first data word (70h, 01h) includes a first byte 70h to store the value of the received read status command 70h and a second byte 01h to store and indicate that the received value/information is associated with the command type and a second data word (00h, 04h) includes a first byte 00h (i.e. the initial value) and a second byte 04h to store and indicate that the executed operation (i.e. the flash memory device's read status operation following the received read status command 70h) is associated with the data-out type (the transmission from the flash memory device 110 to the flash memory controller 105).

Similarly, after receiving the third command signal and the corresponding data output operation is performed, the control circuit 1103 makes a record in the specific buffer 1110 and the record follows the data word (00h, 04h) of the execute read status operation, so that the specific buffer 1110 may sequentially store eight data words (i.e. the data words in the third row of the record information in FIG. 4) in which a first data word (06h, 01h) includes a first byte 06h to store the value of the received command 06h and a second byte 01h to store and indicate that the received value/information is associated with the command type, a second data word (00h, 02h) following the first data word (06h, 01h) includes a first byte 00h to store the value of first address byte of the received address information and a second byte 02h to store and indicate that the received value/information is associated with the address type, a third data word (20h, 02h) following the second data word (00h, 02h) includes a first byte 20h to store the value of second address byte of the received address information and a second byte 02h to store and indicate that the received value/information is associated with the address type, a fourth data word (0Ah, 02h) following the third data word (20h, 02h) includes a first byte 0Ah to store the value of third address byte of the received address information and a second byte 02h to store and indicate that the received value/information is associated with the address type, a fifth data word (01h, 02h) following the fourth data word (0Ah, 02h) includes a first byte 01h to store the value of fourth address byte of the received address information and a second byte 02h to store and indicate that the received value/information is associated with the address type, a sixth data word (00h, 02h) following the fifth data word (01h, 02h) includes a first byte 00h to store the value of fifth address byte of the received address information and a second byte 02h to store and indicate that the received value/information is associated with the address type, a seventh data word (E0h, 01h) following the sixth data word (00h, 02h) includes a first byte E0h to store the value of the received confirm command E0h and a second byte 01h to store and indicate that the received value/information is associated with the command type, and an eighth data word (00h, 04h) following the seventh data word (E0h, 01h) includes a first byte 00h (i.e. the initial value) and a second byte 04h to indicate that the executed operation (i.e. the flash memory device's change read operation following the command E0h) is associated with the data-out type.

Similarly, after receiving the fourth command signal, the control circuit 1103 makes a record in the specific buffer 1110 and the record follows the data word (00h, 04h) of the execute data output operation, so that the specific buffer 1110 may sequentially store three data words (i.e. the data words in the fourth row of the record information in FIG. 4) in which a first data word (ECh, 01h) includes a first byte ECh to store the value of the received command ECh and a second byte 01h to store and indicate that the received value/information is associated with the command type, a second data word (F0h, 02h) includes a first byte F0h to store the value of the specific address F0h and a second byte 02h to store and indicate that the received value/information is associated with the address type, and a third data word (00h, 04h) includes a first byte 00h (i.e. the initial value) and a second byte 04h to store and indicate that the to be executed operation (i.e. the flash memory device's report record operation following the received command ECh) is associated with the data-out type.

It should be noted that, in this example (but not limited), the current pointer position/index of the specific buffer 1110, which initially is equal to zero, is used to indicate the index position corresponding to the last one recorded data word stored by the control circuit 1103, will be updated and incremented by one once a data word is stored by the control circuit 1103, and will be reset as zero if the current pointer position reaches the bottom of the specific buffer 1110 and a next data word is recorded into the specific buffer 1110, is at the beginning index position such as 0. That is, the current pointer position/index is updated in a rounded/circular manner. Thus, the record information is stored into the specific buffer 1110 at the top/beginning of the 4 KB data of the specific buffer 1110, and the information of the other remaining data words following the record information may be configured as the initial data word (00h, 00h). In another example, the current pointer position/index of the specific buffer 1110 may be different and for example may be close to the bottom of the 4 KB data of the specific buffer 1110, and thus a first portion of the record information may be stored at the bottom/end of 4 KB data of the specific buffer 1110 and a second portion (following the first portion) of the record information may be stored at the top/beginning of 4 KB data of the specific buffer 1110. That is, initially the specific buffer 1110 may store the 4 KB data formed by a sequence of 00h (initial values), and the specific buffer 1110 is arranged to store the above-mentioned data words from the top of the specific buffer 1110 to replace the corresponding words/bytes of 00h. The values of the other remaining bytes are 00h.

Further, it should be noted that the record information shown in FIG. 4 is merely illustrative purposes and in practice the record information is merely a sequence of data words which are not arranged in four rows.

When the record information in FIG. 4 has been completely stored in the specific buffer 1110, in response to the reception of the command ECh with the address F0h, the control circuit 1103 controls the specific buffer 1110 outputting and transmitting one copy of the totally buffered information (i.e. all the data stored in the buffer 1110) into the I/O control circuit 1101 and then the one copy of the totally buffered information can be transferred from the I/O control circuit 1101 into the flash memory controller 105 through the communication interface. In the embodiment, for example (but not limited), the control circuit 1103 controls the specific buffer 1110 sequentially outputting a sequence of data words totally buffered in the buffer 1110 one data word by one data word from the buffer's 1110 next pointer position (i.e. the position next to the current pointer position) to the bottom position and then from the top position to the current pointer position. That is, the control circuit 1103 controls the specific buffer 1110 outputting the other remaining information having initial values and then outputting the record information.

Figure 5:
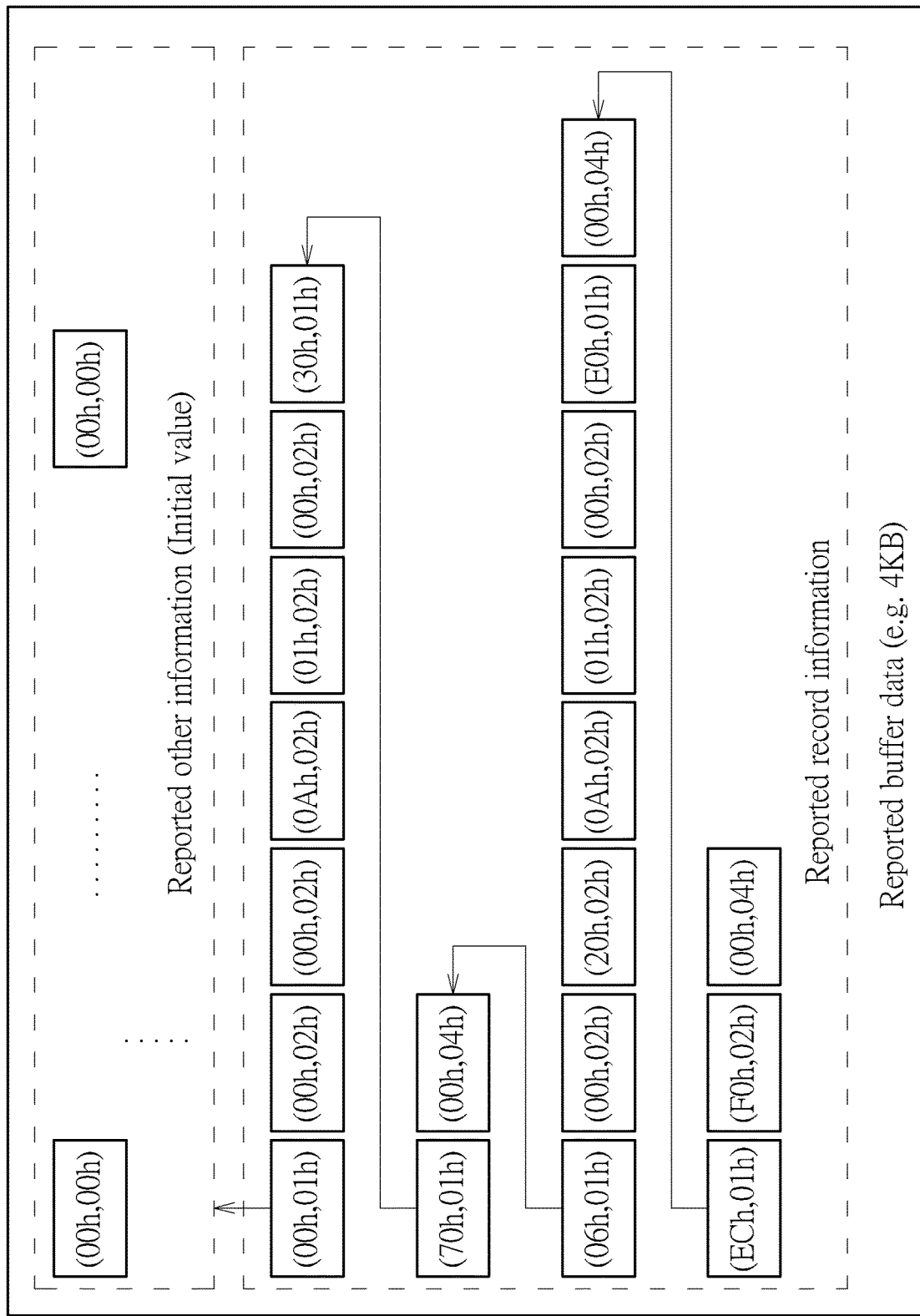
FIG. 5 is a diagram of an example of the actually reported buffer data information transmitted from the flash memory device into the flash memory controller according to the embodiment shown in FIG. 4.

FIG. 5 is a diagram of an example of the actually reported buffer data information transmitted from the flash memory device 110 into the flash memory controller 105 according to the embodiment shown in FIG. 4. In FIG. 5, the actually reported buffer data information 4 KB sequentially comprises the reported other information having initial values (00h, 00h) and the reported record information as shown in FIG. 5. The actually reported buffer data information 4 KB is similarly formed by a sequence of data words in which equivalently a first portion comprises the initial values (00h, 00h) and a second portion comprises the reported record information as shown in FIG. 5. In other embodiment, the control circuit 1103 may control the specific buffer 1110 directly outputting the data information stored in the buffer 1110 from the top to the bottom. This modification also falls within the scope of the invention.

Figure 6:
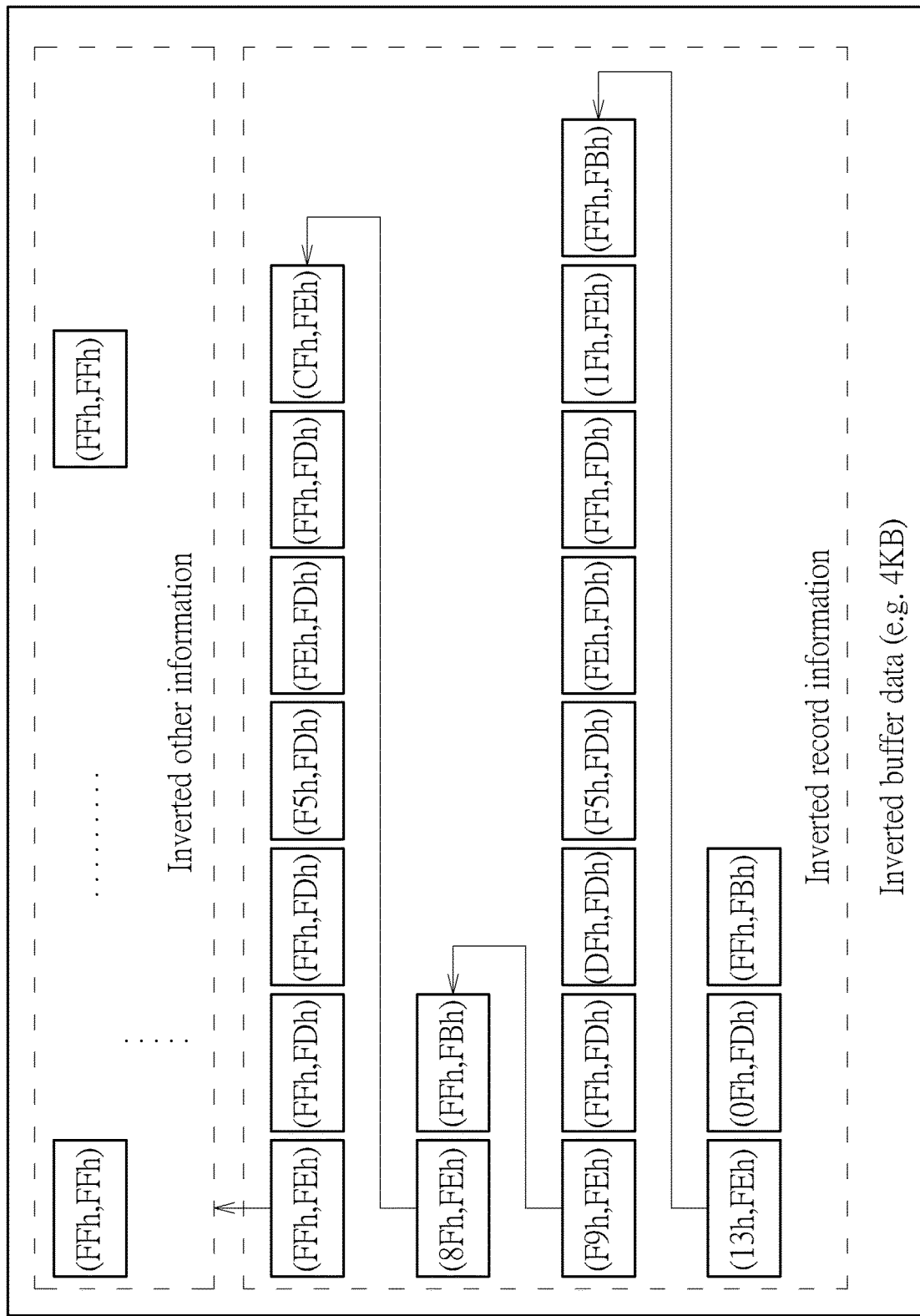
FIG. 6 is a diagram of an example of an inverted data version of the reported buffer data information transmitted from the flash memory device into the flash memory controller according to the embodiment shown in FIG. 5.

Further, in one embodiment, to avoid errors generated during the data transmission through the communication interface, the control circuit 1103 may further generate an inverted data version of one copy of the data information 4 KB shown in FIG. 5 based on the data stored in the buffer 1110 by inverting each data word included by the copy of the data information 4 KB. FIG. 6 is a diagram of an example of an inverted data version of the reported buffer data information transmitted from the flash memory device 110 into the flash memory controller 105 according to the embodiment shown in FIG. 5. In FIG. 6, the additionally reported buffer data information 4 KB is an inverted data version of the 4 KB buffer data of FIG. 5 and it sequentially comprises the inverted values (FFh, FFh) of the initial values (00h, 00h) and the inverted data of the reported record information of FIG. 5. The additionally reported inverted 4 KB data is also similarly formed by a sequence of data words in which equivalently a first portion comprises the values (FFh, FFh) and a second portion comprises the inverted version of the reported record information in FIG. 5. In other embodiment, the control circuit 1103 may control the specific buffer 1110 directly generating and outputting an inverted data version of the data information stored in the buffer 1110 from the top to the bottom. This modification also falls within the scope of the invention.

Figure 7:
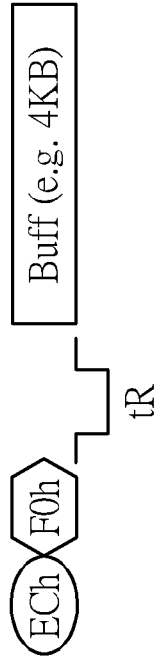
FIG. 7 is a diagram showing different examples of the reported data transmitted from the flash memory device into the flash memory controller according to the different embodiments.
Figure 7:
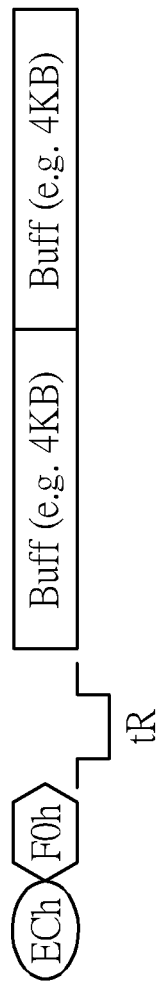
Figure 7:
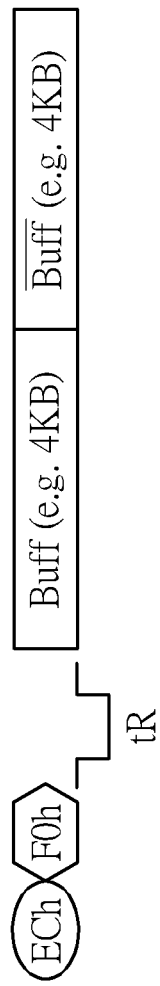
Figure 7:
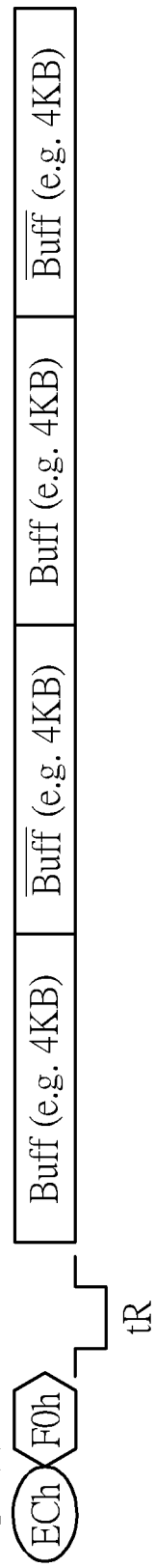

FIG. 7 is a diagram showing different examples of the reported data transmitted from the flash memory device 110 into the flash memory controller 105 according to the different embodiments. In the example (a), in response to the reception of a specific read record command signal, which for example sequentially comprises a read parameter command such as ECh (but not limited) and a read record address such as F0h (but not limited), after waiting for the time period tR to transfer the data information of the specific buffer 1110 into the I/O control circuit 1101, the flash memory device 110 transmits only one copy of the reported 4 KB buffer data Buff (e.g. the reported buffer data in FIG. 5) into the flash memory controller 105 without sending a corresponding inverted data version of the 4 KB buffer data Buff. In another example (b), in response to the reception of a specific read record command signal, which for example sequentially comprises a read parameter command such as ECh (but not limited) and a read record address such as F0h (but not limited), after waiting for the time period tR to transfer the data information of the specific buffer 1110 into the I/O control circuit 1101, the flash memory device 110 transmits two copies of the reported 4 KB buffer data Buff (e.g. the reported buffer data in FIG. 5) into the flash memory controller 105 without sending a corresponding inverted data version of the 4 KB buffer data Buff. In another example (c), in response to the reception of a specific read record command signal, which for example sequentially comprises a read parameter command such as ECh (but not limited) and a read record address such as F0h (but not limited), after waiting for the time period tR to transfer the data information of the specific buffer 1110 into the I/O control circuit 1101, the flash memory device 110 transmits one copy of the reported 4 KB buffer data Buff (e.g. the reported buffer data in FIG. 5) into the flash memory controller 105 and then further transmits an corresponding inverted 4 KB data $\overline{\text{Buff}}$ of the 4 KB buffer data Buff. In another example (d), in response to the reception of a specific read record command signal, which for example sequentially comprises a read parameter command such as ECh (but not limited) and a read record address such as F0h (but not limited), after waiting for the time period tR to transfer the data information of the specific buffer 1110 into the I/O control circuit 1101, the flash memory device 110 transmits one set of the reported 4 KB buffer data Buff and corresponding inverted 4 KB data $\overline{\text{Buff}}$ and then further send the same data set of reported 4 KB buffer data Buff and corresponding inverted 4 KB data $\overline{\text{Buff}}$ again.

By further sending the inverted 4 KB data $\overline{\text{Buff}}$ or sending the 4 KB buffer data Buff with the inverted 4 KB data $\overline{\text{Buff}}$ for multiple times, the flash memory controller 105 (or processor 1051) after receiving the data can compare and check whether the 4 KB buffer data Buff is correct or not. For example (but not limited), the processor 1051 can invert the data words of the inverted 4 KB data $\overline{\text{Buff}}$ to obtain a third 4 KB data and then compare the obtained third 4 KB data is equal to or match to the received 4 KB buffer data Buff so as to determine whether an error occurs in the received 4 KB buffer data Buff during the transmission of the specific communication interface.

Figure 8:
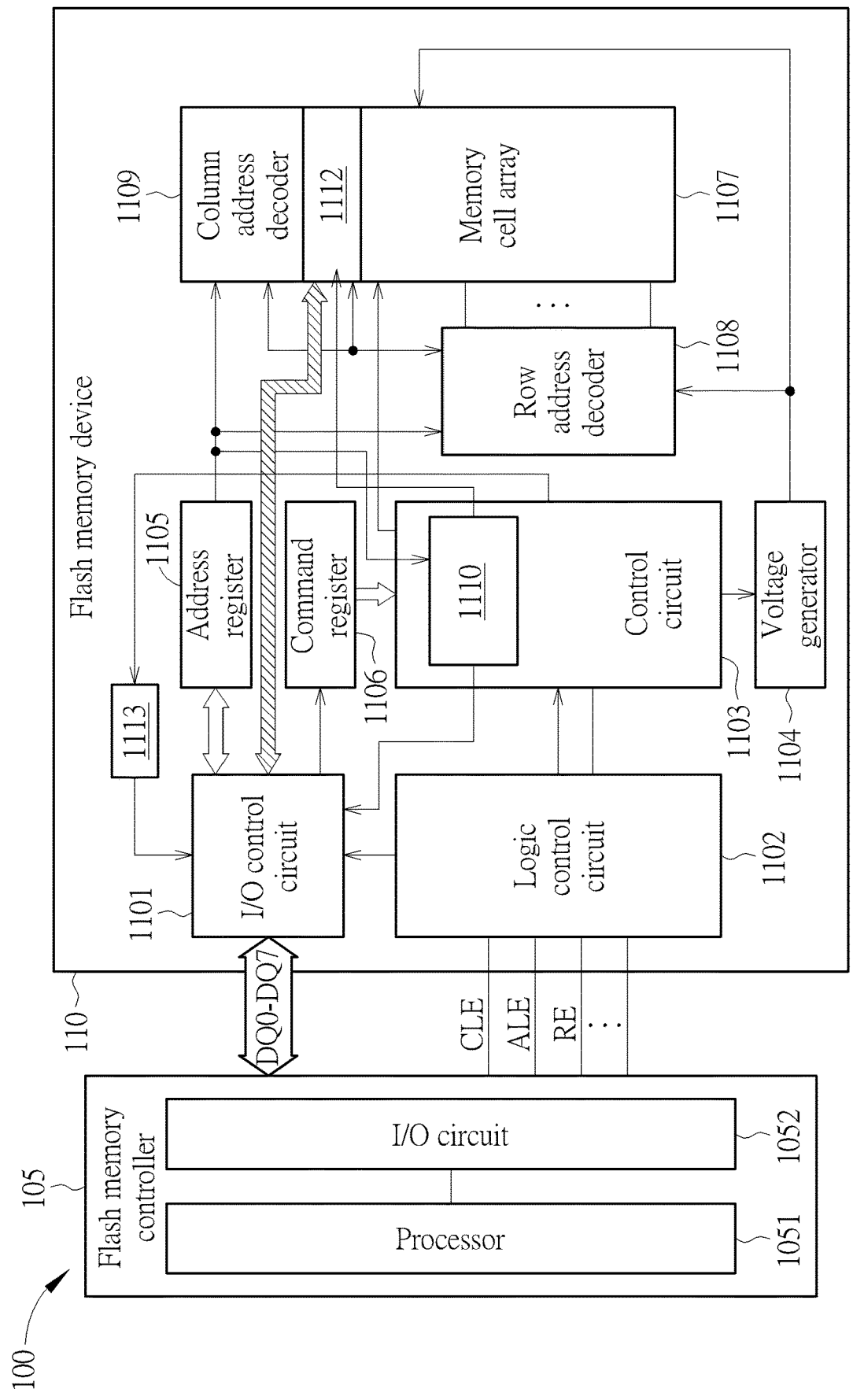
FIG. 8 is a diagram of another example of the storage device comprising the flash memory controller and the flash memory device such as an NAND-type flash memory device including multiples chips/dies according to another embodiment of the invention.

In one embodiment, the data information stored in the specific buffer 1110 can be additionally backed up and stored into one or more storage units such as sectors, pages, blocks, or planes in the memory cell array 1107, and thus the backed up data information will not disappear after the flash memory device 110 is powered off. FIG. 8 is a diagram of another example of the storage device 100 comprising the flash memory controller 105 and the flash memory device 110 such as an NAND-type flash memory device including multiples chips/dies according to another embodiment of the invention. In FIG. 8, the specific buffer 110 is further coupled to the data register 1112, and the control circuit 1103 can output and transmit the whole buffer data such as 4 KB in the specific buffer 1110 into the data register 1112 and control the voltage generator 1104 outputs voltage levels to control the column address decoder 1109 and row address decoder 1108 to write the whole buffer data 4 KB from the data register 1112 into corresponding one or more storage unit in the memory cell array 1107. In other embodiment, the control circuit 1103 may output and transmit partial buffer data (e.g. smaller than 4 KB) in the specific buffer 1110 into the data register 1112 and control the voltage generator 1104 outputs voltage levels to control the column address decoder 1109 and row address decoder 1108 to write the partial buffer data from the data register 1112 into corresponding one or more storage unit in the memory cell array 1107. The modification also obeys the spirits of the invention.

Figure 9:
FIG. 9 is a diagram of an example of the flash memory controller triggering or controlling the flash memory device writing/programming the buffer data of the specific buffer into the memory cell array according to an embodiment of the invention.

FIG. 9 is a diagram of an example of the flash memory controller 105 triggering or controlling the flash memory device 110 writing/programming the buffer data of the specific buffer 1110 into the memory cell array 1107 according to an embodiment of the invention. In FIG. 9, the flash memory controller 105 for example may send a specific write record command signal into the flash memory device 110 through the specific communication interface, wherein the specific write record command signal may sequentially comprise a write command such as 80h, the address information such as five address bytes respectively indicated by Addr, and a write record confirm command such as 13h that is different from a normal write confirm command. After receiving such specific write record command signal, the control circuit 1103 of flash memory device 110 can write/program or back up the buffer data of the buffer 1110 into one or more storage units of the memory cell array 1107. In addition, the control circuit 1103 may write/program or back up a corresponding inverted data version of the buffer data of the buffer 1110 into one or more storage units of the memory cell array 1107. In addition, the control circuit 1103 may write/program or back up the data information of the current pointer position of the buffer data of the buffer 1110 into one or more storage units of the memory cell array 1107. In the bottom example of FIG. 9, the flash memory device 110 for example (but not limited) program and write the data set of reported 4 KB buffer data Buff and corresponding inverted 4 KB data $\overline{\text{Buff}}$ for two times into the memory cell array 1107 and then program and write the data set Ptr (e.g. 2B) of a current pointer position with a corresponding inverted data version $\overline{\text{Ptr}}$ (e.g. 2B) of the current pointer position for two times into the memory cell array 1107. The number of the transmission between the flash memory controller 105 and flash memory device 110 is intended to be a limitation.

Figure 10:
FIG. 10 is a diagram of an example of the flash memory controller triggering or controlling the flash memory device writing/programming the buffer data of the specific buffer into more storage units disposed in multiple different planes of the memory cell array according to an embodiment of the invention.

In other embodiment, the operation of writing and programming the buffer data into the memory cell array 1107 can employ a multi-plane program method. FIG. 10 is a diagram of an example of the flash memory controller 105 triggering or controlling the flash memory device 110 writing/programming the buffer data of the specific buffer 1110 into more storage units disposed in multiple different planes of the memory cell array 1107 according to an embodiment of the invention. In FIG. 10, the flash memory controller 105 for example may send a specific multi-plane write record command signal into the flash memory device 110 through the specific communication interface, wherein the specific multi-plane write record command signal may sequentially comprise a write command such as 80h, the address information such as five address bytes respectively indicated by Addr, and a multi-plane write record confirm command such as 16h that is different from a normal write confirm command and the single plane write record confirm command 13h. After receiving such specific multi-plane write record command signal, the control circuit 1103 of flash memory device 110 can write/program or back up the buffer data of the buffer 1110 into more storage units disposed in multiple different planes of the memory cell array 1107. Similarly, the control circuit 1103 may write/program or back up a corresponding inverted data version of the buffer data of the buffer 1110 into more storage units disposed in multiple different planes of the memory cell array 1107. Similarly, the control circuit 1103 may write/program or back up the data information (and/or corresponding inverted data version) of the current pointer position of the buffer data of the buffer 1110 into more storage units disposed in multiple different planes of the memory cell array 1107.

Figure 11:
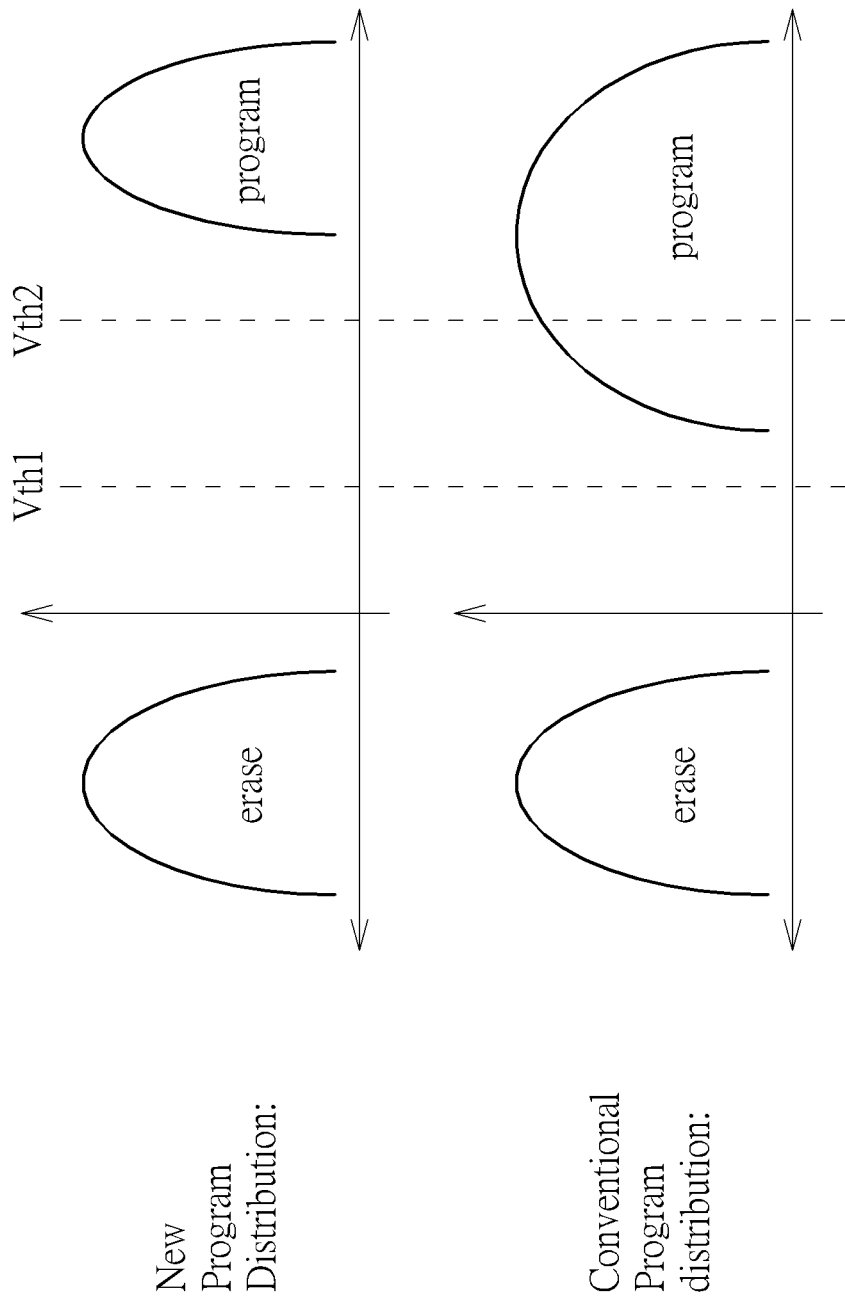
FIG. 11 is a diagram of a comparison between the threshold voltage distribution of the disclosed SLC program method and the threshold voltage distribution of a conventional SLC program operation.

Since the buffer data may be not encoded or not protected, in one embodiment, in order to more correctly write/program the buffer data into one or more storage units in the memory cell array 1107, the control circuit 1103 may control the voltage generator 1104 to output different voltage levels to control the row address decoder 1108 and column address decoder 1109 so as to reduce or minimize the data error probability. FIG. 11 is a diagram of a comparison between the threshold voltage distribution of the disclosed SLC program method and the threshold voltage distribution of a conventional SLC program operation. In the bottom of FIG. 11, the erase state and the program state (i.e. SLC program state) of the conventional SLC program operation can be ideally separated by a first threshold voltage Vth1, i.e. the lower voltage level. However, actually, since the buffer data may be not encoded or not protected, the data error probability will become abnormally higher once the voltage distribution of the program state varies, becomes wider, and crosses the lower voltage level Vth1. In order to significantly increase the reliability, in the disclosed SLC program method, the control circuit 1103 controls the voltage generator 1104 outputting different voltage levels to control the row address decoder 1108 and column address decoder 1109 to make the voltage distribution of the SLC program state become narrower (e.g. the shapes of the voltage distributions of the SLC program state and erase state may be similar or identical) as well as to make the higher voltage level (i.e. a second threshold voltage Vth2) clearly separate the voltage distributions of the SLC program state and erase state. Thus, even though the buffer data may be not encoded and the voltage distribution of the SLC program state may become wider, the wider voltage distribution of the SLC program state does not easily cross the threshold voltage Vth1. This can significantly reduce the error probability.

Figure 12:
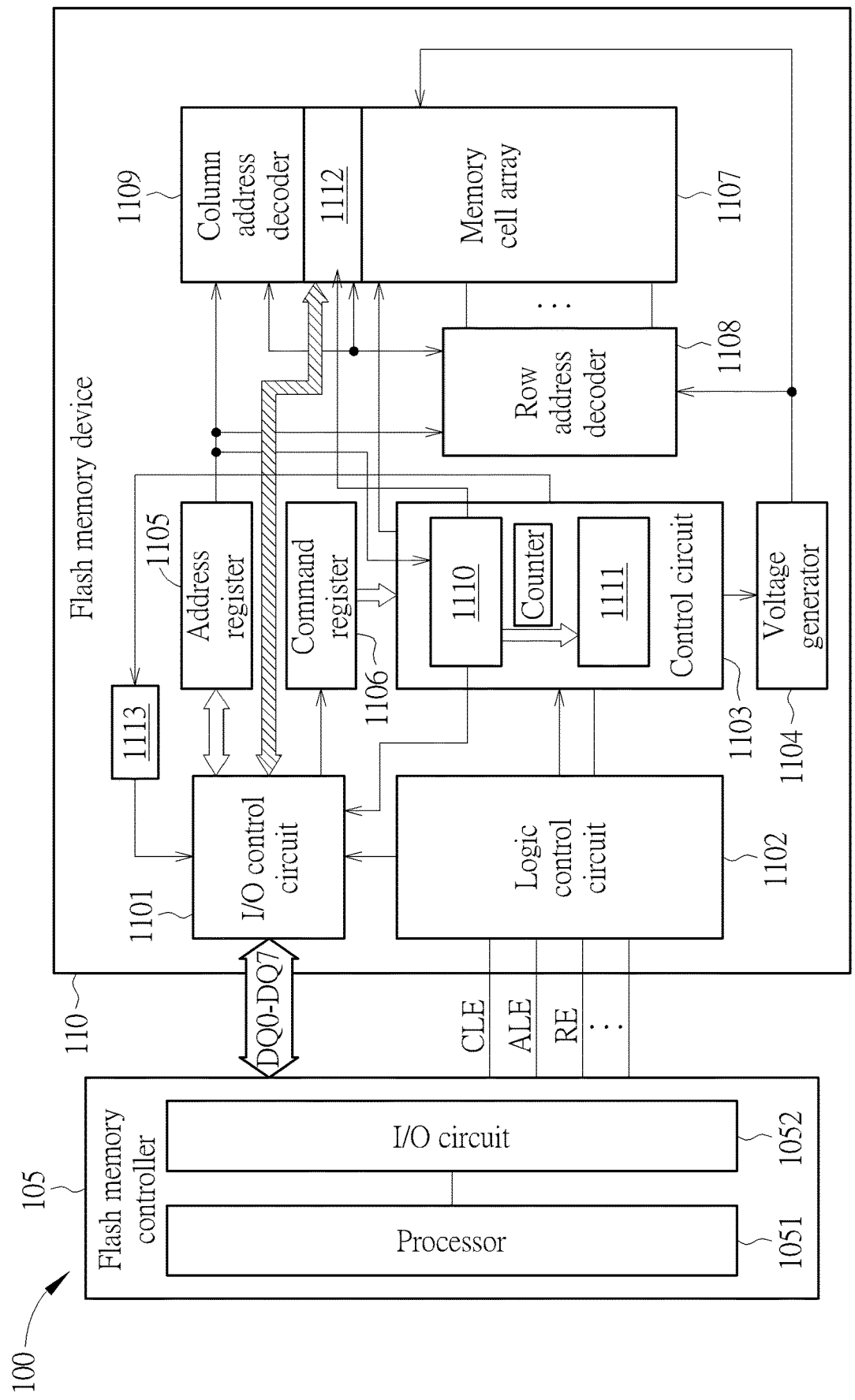
FIG. 12 is a diagram of another example of the storage device according to another embodiment of the invention.

In other embodiments, the buffer data of the specific buffer 1110 may be copied into another different backup buffer to protect the specific buffer 1110. FIG. 12 is a diagram of another example of the storage device 100 according to another embodiment of the invention. Compared to the embodiment of FIG. 8, the control circuit 1103 further comprises a specific counter and a backup buffer 1111; in another embodiment, the backup buffer 1111 can be disposed in the flash memory device 110 and externally coupled to the control circuit 1103 and memory cell array 1107. The control circuit 1103 can copy and transmit the buffer data from the specific buffer 1110 into the backup buffer 1111 in response to the request (e.g. a specific backup record command signal) sent from the flash memory controller 105. The specific counter has a counting value which is initially equal to zero and is incremented by one each time when the flash memory device 110 receives a specific backup record command signal sent from the flash memory controller 105. When the flash memory device 110 receives a specific backup record command signal, the control circuit 1103 is arranged to copy and transmit the whole buffer data (e.g. including record information and other remaining initial values) of the specific buffer 1110 into the backup buffer 1111, to use the current pointer position of the specific buffer 1110 as a current pointer position of the backup buffer 1111, to make a record of the backup record command signal into and at data word(s) of the backup buffer 1111 from a start position indicated by the current pointer position, and then to record the counting value of the specific counter into a next data word following the recorded data words corresponding to the backup record command signal in the backup buffer 1111. That is, the control circuit 1103 is arranged to store and record a received latest backup record command signal and the corresponding latest version information into the backup buffer 1111. Thus, the control circuit 1103 can correctly and appropriately find the record information of the latest backup record command signal to correctly generate and obtain a sequence of data words from the data of the backup buffer 1111 even though more backup record command signals are stored in the backup buffer 1111.

Figure 13:
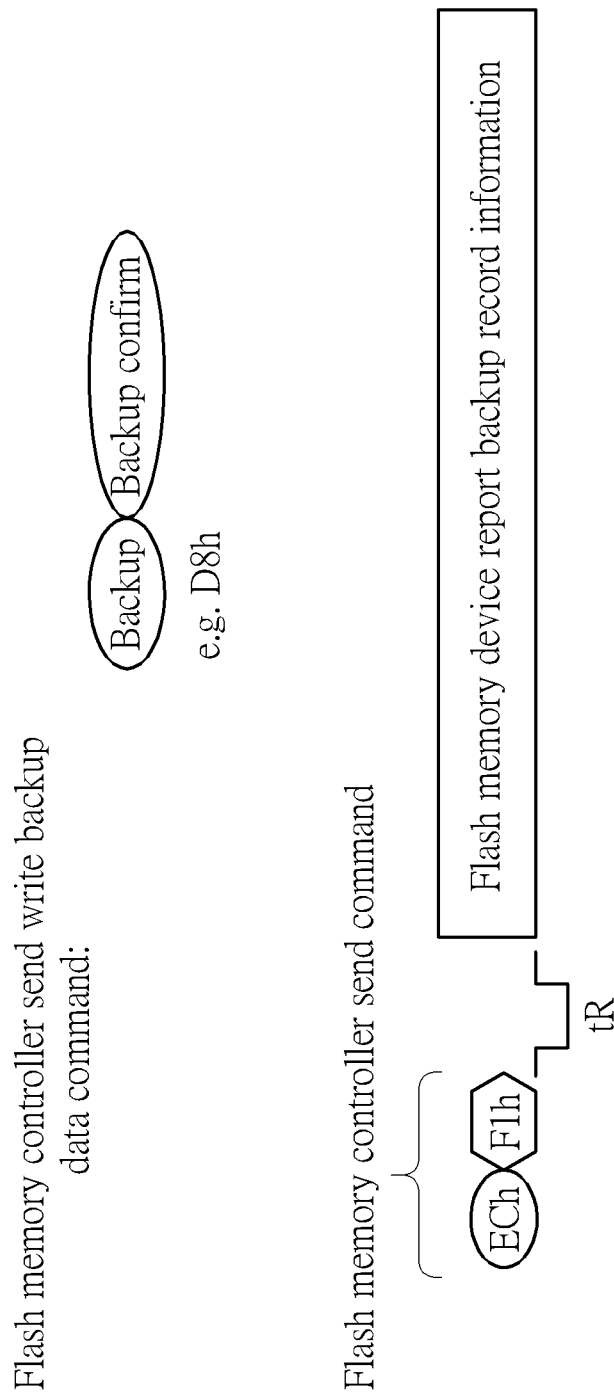
FIG. 13 is a diagram of the different examples of the flash memory controller respectively sending a specific backup record command signal and sending a read backup record command signal into the flash memory device through the specific communication interface according to different embodiments of the invention.

FIG. 13 is a diagram of the different examples of the flash memory controller 105 respectively sending a specific backup record command signal and sending a read backup record command signal into the flash memory device 110 through the specific communication interface according to different embodiments of the invention. In the top example of FIG. 13, the flash memory controller 105 sends a backup record command signal (e.g. a write backup data command signal) into the flash memory device 110 through the specific communication interface, and the backup record command signal sequentially comprises a buffer backup command such as D8h (but not limited) and a backup confirm command. When the flash memory device 110 receives such backup record command signal, the control circuit 1103 can copy and transmit the buffer data from the specific buffer 1110 into the backup buffer 1111; the operations are detailed in the previous paragraph. Further, in the bottom example of FIG. 13, the flash memory controller 105 may send a specific read backup record command signal into the flash memory device 110 through the specific communication interface, and the specific read backup record command signal for example sequentially comprises a read parameter command such as ECh (but not limited) and a read backup record address such as F1h (but not limited) that is different from the read record address F0h. When receiving the read parameter command ECh and the read backup record address F1h, the flash memory device 110 (or control circuit 1103) can know that the specific read backup record command signal is currently received and it is used to trigger or make the flash memory device 110 return and transmit the data information stored in the backup buffer 1111 to the flash memory controller 105 through the specific communication interface, i.e. transmitting the data contents of one or more data words in the backup buffer 1111. Similarly, the time tR means the time period of the control circuit 1103 transferring the data information (i.e. backup record information) of the backup buffer 1111 into the I/O control circuit 1101. Thus, after tR, the flash memory device 110 can transmit the data information of the backup buffer 1111 from the I/O control circuit 1101 into the flash memory controller 105 through the communication interface such as pins DQ0-DQ7. In this embodiment, the flash memory device 110 can transmit one copy or more copies of the data information of the backup buffer 1111 into the flash memory controller 105 and/or it can transmit one copy or more copies of an inverted version of the data information of the backup buffer 1111 into the flash memory controller 105. For example (but not limited), the flash memory device 110 can transmit at least one set of one copy of the data information of the backup buffer 1111 and one copy of the corresponding inverted version. For example, the size of the backup buffer 1111 is equal to 4 KB (but not limited), and the flash memory device 110 sequentially transmits the backup buffer's 1111 original data content 4 KB, inverted data content 4 KB, original data content 4 KB, and inverted data content 4 KB to the flash memory controller 105; the operations will be explained later.

Figure 14:
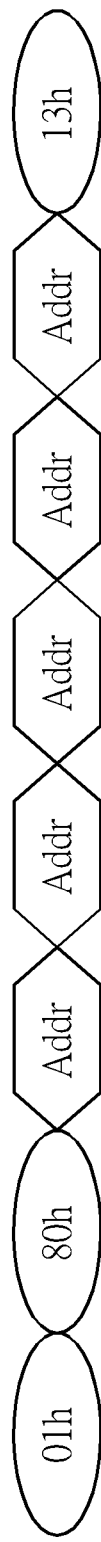
FIG. 14 is a diagram of the examples of the flash memory controller triggering or controlling the flash memory device respectively writing/programming the buffer data of the specific buffer and writing/programming the buffer data of the backup buffer into the memory cell array by using different prefix commands such as prefix commands 01h and 02h according to different embodiments of the invention.
Figure 14:
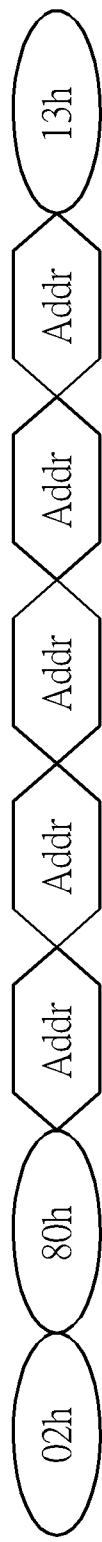

In addition, the operation of writing/programming the buffer data of a buffer into one or more storage units of the memory cell array 1107 can be applied into the backup buffer 1111; that is, the operations mentioned in the embodiments of FIGS. 9-11 can be similarly applied into the operation of the backup buffer 1111. FIG. 14 is a diagram of the examples of the flash memory controller 105 triggering or controlling the flash memory device 110 respectively writing/programming the buffer data of the specific buffer 1110 and writing/programming the buffer data of the backup buffer 1111 into the memory cell array 1107 by using different prefix commands such as prefix commands 01h and 02h according to different embodiments of the invention. In the top example of FIG. 14, the flash memory controller 105 for example may send a first write record command signal into the flash memory device 110 through the specific communication interface, wherein the first write record command signal may sequentially comprise a first prefix command such as 01h, a write command such as 80h, the address information such as five address bytes respectively indicated by Addr, and a write record confirm command such as 13h that is different from a normal write confirm command. After receiving such first write record command signal, the control circuit 1103 of flash memory device 110 can write/program or back up the buffer data of the specific buffer 1110 into one or more storage units of the memory cell array 1107 based on the prefix command 01h which indicates the specific buffer 1110. In the bottom example of FIG. 14, the flash memory controller 105 for example may send a second write record command signal (i.e. a write backup record command signal) into the flash memory device 110 through the specific communication interface, wherein the second write record command signal may sequentially comprise a second prefix command such as 02h, a write command such as 80h, the address information such as five address bytes respectively indicated by Addr, and a write record confirm command such as 13h that is different from a normal write confirm command. After receiving such second write record command signal, the control circuit 1103 of flash memory device 110 can write/program or back up the buffer data of the backup buffer 1111 into one or more storage units of the memory cell array 1107 based on the prefix command 02h which indicates the backup buffer 1111.

Similarly, in other embodiment, the operation of writing and programming the buffer data of the backup buffer 1111 into the memory cell array 1107 can employ a multi-plane program method. The corresponding operations are not detailed for brevity.

Further, it should be noted that in other embodiments the above-mentioned at least one command may be implemented by using other different command(s) which can be configured to be different from a standard command (or a vendor specific command) and may be implemented by using reserved command(s) such as 0Bh, 12h, 14h, 18h, 1Bh-1Ch, 62h-64h, AAh, 76h, 82h-83h, 86h, and 8Eh wherein 'h' means hexadecimal. The following table shows the different examples of the reserved commands which can be used to implement the command(s):

| Type | Opcode |
|---|---|
| Standard Command Set | 00h, 05h - 06h, 10h - 11h, 15h, 30h - 32h, 35h, 3Fh, 60h, 70h, 78h, 80h - 81h, 85h, 90h, D0h - D1h, D4h - D5h, D9h, E0h - E2h, ECh - EFh, F1h - F2h, F9h, FAh, FCh, FFh |
| Vendor Specific | 01h - 04h, 07h - 0Ah, 0Ch - 0Fh, 13h, 16h - 17h, 19h - 1Ah, 1Dh - 2Fh, 33h - 34h, 36h - 3Eh, 40h - 5Fh, 61h, 65h - 6Fh, 71h - 75h, 77h, 79h - 7Fh, 84h, 87h - 8Dh, 8Fh, 91h - CFh, D2h - D3h, D6h - D8h, DAh - DFh, E3h - EBh, F0h, F3h - F8h, FBh, FD - FEh |
| Reserved | 0Bh, 12h, 14h, 18h, 1Bh - 1Ch, 62h - 64h, 76h, 82h - 83h, 86h, 8Eh |

Additionally, in other embodiments, the above-mentioned operations of the flash memory device's 110 storing and recording the actual transmission history information (excluding accessed data of storage unit(s) of the flash memory device 110) of the specific communication interface can be implemented in a flash memory controller. That is, the flash memory controller can store and record its actual behavior of the flash memory controller, and it can be used to record the actual values and actual sequence of the command/address data sent from the flash memory controller by itself.

Figure 15:
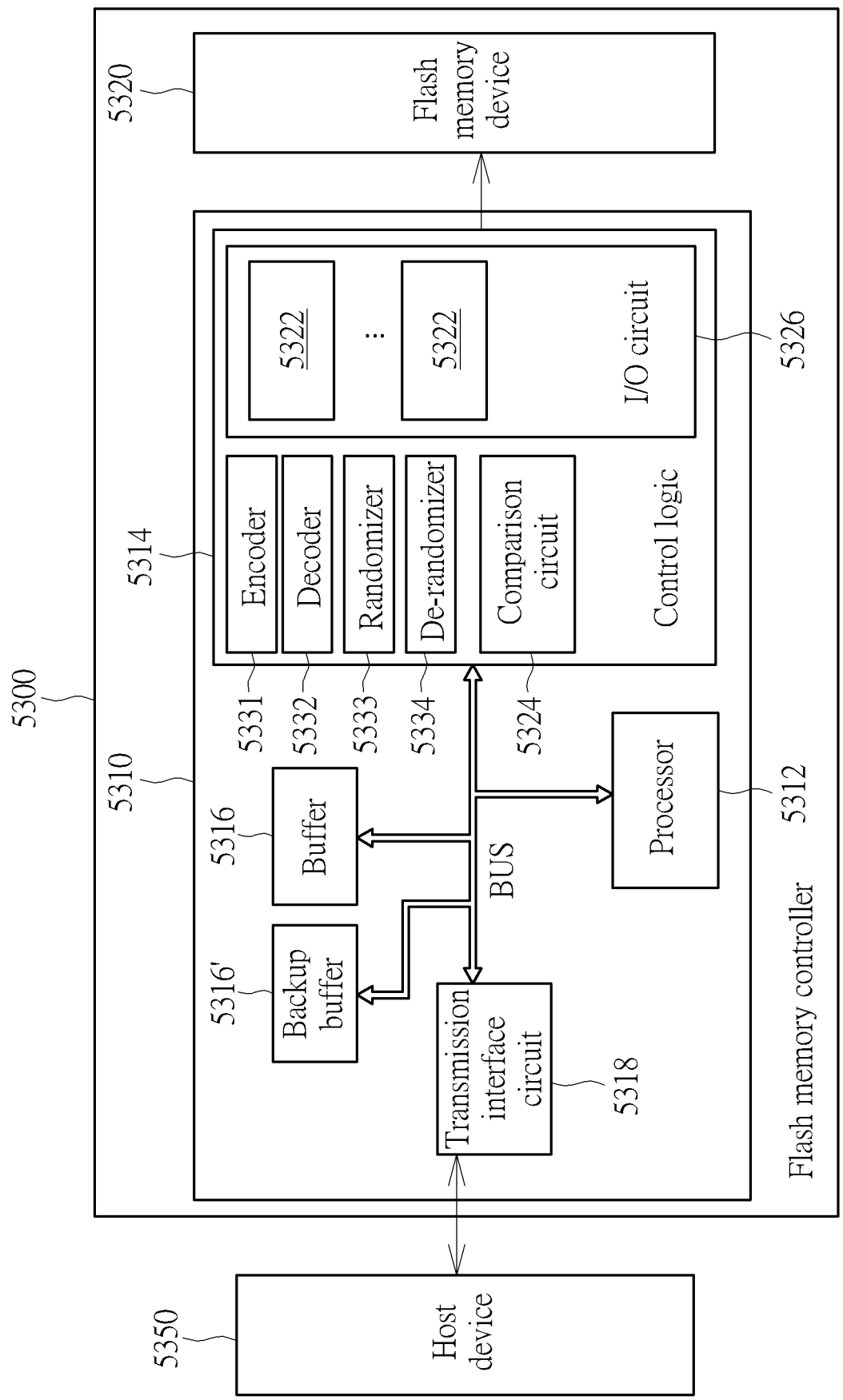
FIG. 15 is a diagram of an example of a storage device comprising a flash memory controller and a flash memory device such as an NAND-type flash memory device including multiples chips/dies according to embodiments of the invention.
Figure 16:
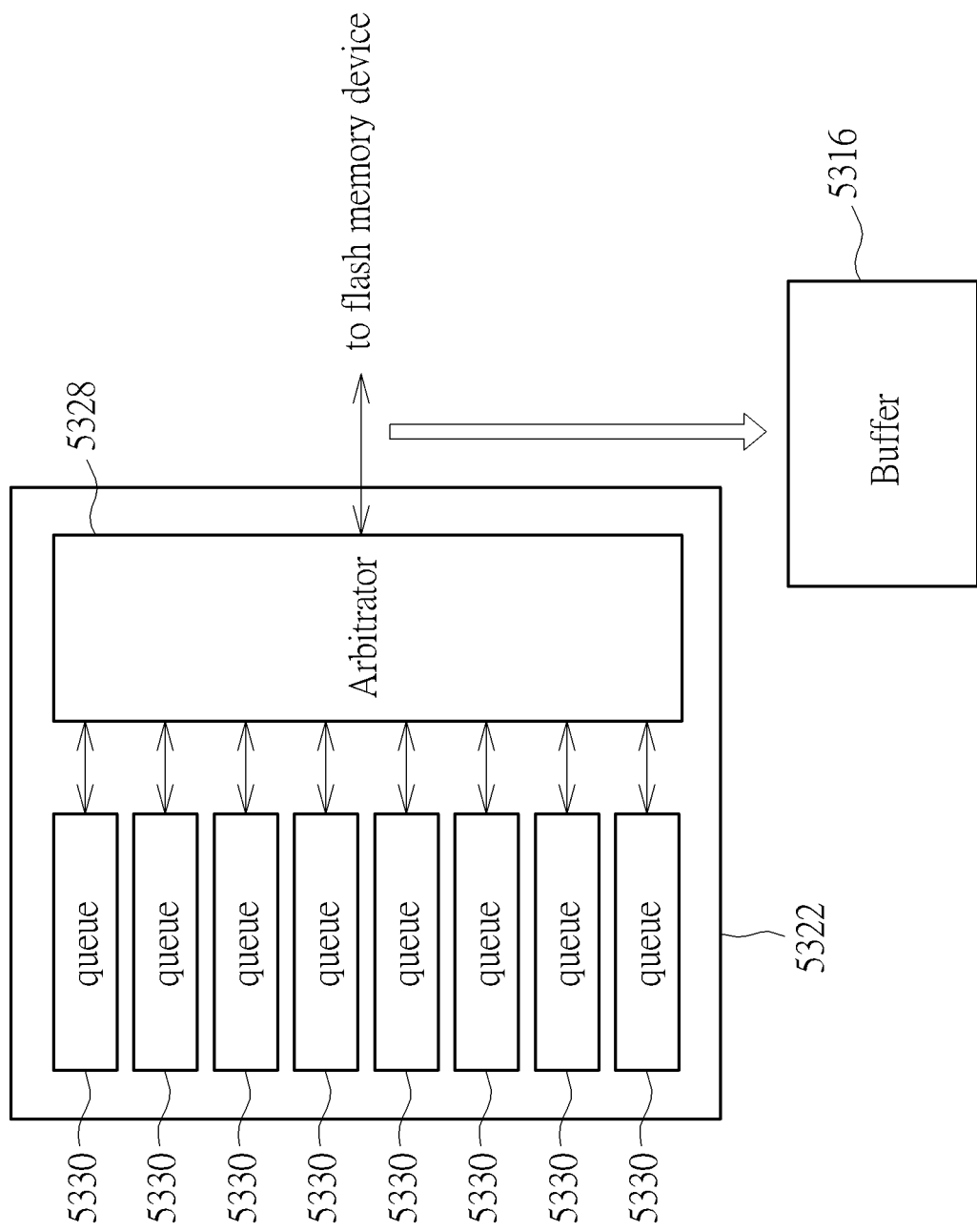
FIG. 16 is a diagram of an example of a channel controller including an I/O circuit in the embodiment of FIG. 15.

Refer to FIG. 15 in conjunction of FIG. 16. FIG. 15 is a diagram of an example of a storage device 5300 comprising a flash memory controller 5310 and a flash memory device 5320 such as an NAND-type flash memory device including multiples chips/dies according to embodiments of the invention. FIG. 16 is a diagram of an example of a channel controller including an I/O circuit in the embodiment of FIG. 15. In FIG. 15, the storage device 5300 for example is a memory device and is externally coupled to the host device 5350, and it may be arranged for providing the host device 5350 with storage space, and obtaining one or more driving voltages from the host device 5350 as power source of the storage device 5300. Examples of the host device 5350 may include, but are not limited to: a multifunctional mobile phone, a wearable device, a tablet computer, and a personal computer such as a desktop computer and a laptop computer. Examples of the storage device 5300 may include, but are not limited to: a solid state drive (SSD), and various types of embedded memory devices such as that conforming to Peripheral Component Interconnect Express (PCIe) specification, etc. According to this embodiment, the storage device 5300 may comprise a flash memory controller 5310, and may further comprise a flash memory device 5320, where the flash memory controller 5310 is arranged to control operations of the storage device 5300 and access the flash memory device/module 5320, and the flash memory device 5320 is arranged to store information. The flash memory device 5320 may comprise at least one flash memory chip. The operations and functions of the flash memory controller 5310 are similar to those of flash memory controller 105 of FIG. 1, and the operations and functions of the flash memory device 5320 are similar to those of flash memory device 110.

In practice, as shown in FIG. 15, the flash memory controller 5310 may comprise the processor 5312 (including the operations and functions similar to those of processor 1051 of FIG. 1) such as a microprocessor, a control logic circuit 5314, a buffer 5316 such as a static random access memory (SRAM), a backup buffer 5316' such as SRAM, and a transmission interface circuit 5318, where the above components may be coupled to one another via a bus. The buffer 5316 provides the flash memory controller 5310 with internal storage space. The control logic circuit 5314 controls the flash memory device 5320, and it may comprise an encoder 5331, a decoder 5332, a randomizer 5333, a de-randomizer 5334, a comparison circuit 5324, and an I/O control circuit 5326 which includes the operations and functions similar to those of the I/O circuit 1052 of FIG. 1.

The transmission interface circuit 5318 may conform to the communication specification such as Serial Advanced Technology Attachment (Serial ATA, or SATA) specification, Peripheral Component Interconnect (PCI) specification, Peripheral Component Interconnect Express (PCIe) specification, UFS specification, etc., and it performs communications according to such communication specification, for example, performs communication with the host device 5350 for the storage device 5300. The host device 5350 may comprise the transmission corresponding interface circuit conforming to the above-mentioned communication specification, for performing communications with the storage device 5300 for the host device 5350.

The host device 5350 may transmit host commands and corresponding logical addresses to the flash memory controller 5310 to access the storage device 5300. The flash memory controller 5310 receives the host commands and the logical addresses, and translates the host commands into memory operating commands (which may be simply referred to as operating commands), and further controls the flash memory device 5320 by sending at least one command signal which may be write/program, read, erase, trim, or other command signal(s) to perform reading, writing/programing, erasing, trimming, or other operations upon one or more storage units having physical addresses within the flash memory device 5320. The physical addresses correspond to the logical addresses.

The encoder 5331 is arranged to correspondingly generate error correction code (ECC) data in response to input data which may be sent from the host device 5350 and to be stored into one or more storage units of the flash memory device 5320. The transmission of the input data with the generated ECC data will follow a write command signal sent from the flash memory controller 5310 into the flash memory device 5320 through the specific communication interface so as to avoid data errors. Correspondingly, the decoder 5332 is arranged to calculate the number of errors in data read from the flash memory device 5320 and to correct the errors in the read data by using ECC data. The randomizer 5333 is arranged to adjust the input data (or the input data with ECC data), which may be sent from the host device 5350 and to be stored into one or more storage units of the flash memory device 5320, in order by using a seed value to generate encoded data so as to provide the protection. The de-randomizer 5334 is arranged to an inverse operation of that of the randomizer 5333 to generate decoded data.

The above command signal(s) and/or the encoded/decoded data are transferred the control logic circuit 5314 and the flash memory device 5320 through the specific communication interface by using the I/O circuit 5326. As shown in FIG. 15, the I/O circuit 5326 comprises a plurality of channel controllers 5322 which respectively are coupled to and correspond to the different channels of the memory cell array 1107 included by the flash memory device 5320, and each channel controller 5322 operate independently and individually. As shown in FIG. 16, a channel controller 5322 comprises an arbitrator 5328 and a plurality of queues 5330 which are respectively coupled to the arbitrator 5328. The different queues 5330 of the same channel are respectively coupled to and correspond to different chips/dies of the same channel in the flash memory device 5320.

When the processor 5312 issues and sends different command signals through the bus into the I/O circuit 5326, the different command signals corresponding to the same channel may be respectively buffered in the different queues 5330 of the same channel, and then the arbitrator 5328 appropriately selects, outputs, and transmits the selected command signals into the flash memory device 5320 through the specific communication interface according to the different conditions/statuses of the different chips/dies of the same channel. That is, the arbitrator 5328 can appropriately determine the order of the command signals buffered in the queues 5330 and to be passed into the flash memory device 5320.

In the embodiments, when a command signal is selected, outputted, and transmitted from the queue 5330 into the flash memory device 5320 through the specific communication interface, based on the same operations and functions, the command/address information of the command signal can be stored and recorded into the buffer 5316 by using the specific format such as the above-mentioned data word in which a first byte stores the actual value of the recorded information and a second byte is used to store and indicate the type. In addition, a behavior operation such as a data-output operation executed by the flash memory device 5320 can be also stored and recorded into the buffer 5316 based on the format of the data word.

For example (but not limited), the I/O circuit 5326 may be configured to have the operations and functions similar to those of the control circuit 1103 in the embodiments of FIG. 1, FIG. 8 and/or FIG. 12. For instance, the I/O circuit 5326 may store the behavior history information of the flash memory controller 5310, e.g. the command/address data of one or more command signal and/or the corresponding operations actually executed by the flash memory device 5320 into the buffer 5316. For example, the buffer 5316 stores the information (i.e. the actual transmission history information excluding data of storage units) each time when the flash memory controller 5310 currently and actually outputs the information into the flash memory device 5320.

In practice, the buffer 5316 for example (but not limited) includes the storage space of 4 KB (the tailing 'KB' indicates the size of one thousand data bytes), and the I/O circuit 5326 controls the buffer 5316 using a specific storage format to record the actual content value of each behavior information and to record the type of the each behavior information. The specific storage format for example is a data word mentioned above in the previous paragraphs and is not detailed for brevity. For example, in the examples of command signals of FIG. 3, the buffer 5316 can similarly store and record the 4 KB data as shown in FIG. 4. The other operations are similar and not detailed again.

In other embodiments, the buffer data of the specific buffer 5316 may be copied into another different backup buffer to protect the specific buffer 5316. The I/O circuit 5326 (or processor 5312) can copy and transmit the buffer data from the specific buffer 5316 into the backup buffer 5316' in response to the request of the flash memory controller 5310. In practice, the I/O circuit 5326 may has an operation of a specific counter to output a counting value which is initially equal to zero and is incremented by one each time when the flash memory controller 5310 copies the data content from the buffer 5316 into the backup buffer 5316'. For example, the I/O circuit 5326 is arranged to copy and transmit the whole buffer data (e.g. including record information and other remaining initial values) of the specific buffer 5316 into the backup buffer 5316', to use the current pointer position of the specific buffer 5316 as a current pointer position of the backup buffer 5316' and then to record the counting value of the specific counter into a next data word following the latest recorded data word in the backup buffer 5316'. Thus, the I/O circuit 5326 can correctly and appropriately find the actual values of the latest recorded information in the backup buffer 5316' to correctly generate and obtain a sequence of data words from the data of the backup buffer 5316'.

Further, in one embodiment, the comparison circuit 5324 can be used to fetch and obtain the buffer data from the specific buffer 5316 (or from the backup buffer 5316'), to receive and obtain the buffer data of the buffer 1110 (or the backup buffer 1111) sent from the flash memory device 5320 through the specific communication interface, and then to compare the fetched buffer data originally stored by the flash memory controller 5310 with the received buffer data originally stored by the flash memory device 5320 to determine whether data error occur or not. This can significantly improve the reliability of data protection for buffering and recording the actual transmission history information of the specific communication interface between the flash memory device 5320 and the flash memory controller 5310. In addition, the record information before stored into the buffer 5316 can be further encoded and protected by an encoding engine such as the encoder 5331 or by the comparison circuit 5324 to provide a better data protection, and the encoded record information can be correspondingly decoded by the decoder 5332 or by the comparison circuit 5324. By doing so, the comparison circuit 5324 for example may decode the encoded buffer data stored in the buffer 5316 to generate the decoded buffer data and then compare the decoded buffer data with the received buffer data originally stored by the flash memory device 5320 to determine whether data error occur or not.

Further, the processor 5312 equivalently may issue and generate a command signal into the control logic circuit 5314 though the bus, and the command signal is buffered in a specific queue of a specific channel controller of the I/O circuit 5322. The arbitrator 5328, may control the specific buffer 5316 storing a first transmission history information of the specific communication interface. The first transmission history information of the specific communication interface comprises at least one of: a data content and a data type of command information of the command signal when the command signal is selected by the arbitrator 5328 to output the command signal into the flash memory device 5320, a data content and a data type of address information of the command signal when the command signal is selected by the arbitrator 5328 to output the command signal into the flash memory device 5320, and a data type of a data input/output operation executed by the flash memory device 5320. The flash memory controller 5310 is arranged to control the flash memory device 5320 storing and recording a second transmission history information of the specific communication interface in a specific buffer (e.g. 1110 in FIG. 1) of the flash memory device 5320/110, to transmit the second transmission history information from the specific buffer (e.g. 1110 in FIG. 1) into a data register (e.g. 1112 in FIG. 1) of the flash memory device 5320/110, and then to write the second transmission history information from the data register (e.g. 1112 in FIG. 1) into at least one storage unit of a memory cell array (e.g. 1107 in FIG. 1) of the flash memory device 5320/110. The comparison circuit 5324 is arranged to compare the second transmission history information, sent from the flash memory device 5320/110, with the first transmission history information stored in the specific buffer 5316 of the flash memory controller 5310 to determine whether an error occurs or not. It should be noted that the flash memory controllers 5310/105 may have the same or similar operations, functions, and circuit components, and the flash memory devices 5320/110 may also have the same or similar operations, functions, and circuit components; this is not detailed again for brevity.

Further, it should be noted that the examples of command signals shown in FIG. 3 are merely used for illustrative purposes and not intended to be a limitation. In other embodiment, the address/command data of any type command signal can be recorded and stored into the specific buffer 1110 of FIG. 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory device to be used in a storage device and coupled to a flash memory controller of the storage device through a specific communication interface, comprising:
    an input/output (I/O) control circuit, coupled to the flash memory controller through the specific communication interface;
    a command register, coupled to the I/O control circuit, for buffering command information of a command signal sent from the flash memory controller and transmitted through the I/O control circuit;
    an address register, coupled to the I/O control circuit, for buffering address information of the command signal sent from the flash memory controller and transmitted through the I/O control circuit;
    a memory cell array, at least having a first plane and a second plane, wherein the second plane is different from the first plane;
    at least one address decoder, coupled to the memory cell array; and
    a control circuit having a specific buffer, coupled to the I/O control circuit, the memory cell array, the address register, and the command register, the control circuit being arranged to control the specific buffer storing a transmission history information of the specific communication interface, and the transmission history information comprises at least one of a data content and a data type of the command information buffered in the command register, a data content and a data type of the address information buffered in the address register, and a data type of a data input/output operation executed by the flash memory device.

2. The flash memory device of claim 1, wherein the specific buffer is arranged to use a format of a data word to store a data content and a data type of the transmission history information, and a first byte in the data word is used to store and indicate the data content while a second byte in the data word is used to store and indicate the data type which is a command type, an address type, a data-in type, or a data-out type.

3. The flash memory device of claim 1, wherein the data input/output operation executed by the flash memory device comprises at least one of a read status operation requested by the flash memory controller, a data read operation, and a data write operation.

4. The flash memory device of claim 1, wherein the control circuit controls the specific buffer transmitting a copy of the transmission history information buffered in the specific buffer into a data register of the flash memory device so as to write and record the transmission history information from the data register into at least one storage unit of the memory cell array of the flash memory device.

5. The flash memory device of claim 4, wherein the control circuit transmits the copy of the transmission history information and a current pointer position of the specific buffer into the data register so as to write the copy of the transmission history information and the current pointer position from the data register into the at least one storage unit of the memory cell array of the flash memory device, in response to a reception of a write record command signal which is sent from the flash memory controller and sequentially comprises a write e command, a specific address information, and a write record confirm command; the current pointer position of the specific buffer is an index position of a last one recorded data word stored by the specific buffer.

6. The flash memory device of claim 5, wherein the control circuit further generates and transmits an inverted data version of the copy of the transmission history information with the current pointer position of the specific buffer into the data register so as to further write the inverted data version from the data register into the at least one storage unit of the memory cell array of the flash memory device.

7. The flash memory device of claim 4, wherein the control circuit controls the specific buffer transmitting the copy of the transmission history information buffered in the specific buffer into the data register of the flash memory device to write the transmission history information from the data register into multiple storage units disposed in multiple different planes of the memory cell array of the flash memory device, in response to a reception of a specific multi-plane write record command signal which is sent from the flash memory controller and sequentially comprises a write command, a specific address information, and a multi-plane write record confirm command that is different from a normal write confirm command and a write record confirm command.

8. The flash memory device of claim 1, wherein the control circuit controls the specific buffer outputting the transmission history information into the I/O control circuit of the flash memory device to make the I/O control circuit transfer the transmission history information to the flash memory controller through the specific communication interface in response to a reception of a read record command signal which is sent from the flash memory controller and sequentially comprises a read parameter command and a read record address.

9. The flash memory device of claim 1, wherein the control circuit controls the specific buffer outputting the transmission history information into the I/O control circuit of the flash memory device one data word by one data word from a next pointer position of the specific buffer into a current pointer position, and the current pointer position is an index position of a last one recorded data word stored by the specific buffer while the next pointer position is an index position next to the current pointer position.

10. The flash memory device of claim 1, wherein the control circuit controls the specific buffer outputting multiple copies of the transmission history information into the I/O control circuit of the flash memory device to make the I/O control circuit transfer the transmission history information for multiple times to the flash memory controller through the specific communication interface.

11. The flash memory device of claim 1, wherein the control circuit generates an inverted data version of the transmission history information and transmits at least one set of the transmission history information with the inverted data version of the transmission history information to the I/O control circuit of the flash memory device to make the I/O control circuit transfer at least one set of the transmission history information with the inverted data version of the transmission history information for at least one time to the flash memory controller through the specific communication interface; a hexadecimal value of a data byte in the inverted data version of the transmission history information is obtained by inverting a hexadecimal value of a corresponding data byte of the transmission history information.

12. The flash memory device of claim 1, wherein the control circuit further comprises a backup buffer; the control circuit is arranged to store the transmission history information buffered in the specific buffer and information of an index position of a latest one data word stored by the specific buffer into the backup buffer, in response to a reception of a backup record command signal which is sent from the flash memory controller and sequentially comprises a buffer backup command and a backup confirm command.

13. The flash memory device of claim 12, wherein the control circuit controls the backup buffer outputting backup information in the backup buffer into the I/O control circuit of the flash memory device to make the I/O control circuit transfer the backup information to the flash memory controller through the specific communication interface in response to a reception of a read backup record command signal which is sent from the flash memory controller and sequentially comprises a read parameter command and a read backup record address.

14. The flash memory device of claim 12, wherein the control circuit controls the specific buffer transmitting a copy of the transmission history information buffered in the specific buffer into a data register of the flash memory device so as to write the transmission history information from the data register into at least one storage unit of the memory cell array of the flash memory device, in response of a reception of a first write record command signal which is sent from the flash memory controller and sequentially comprises a first prefix command, a write command, address information, and a write record confirm command that is different from a normal write confirm command; and, the control circuit controls the backup buffer transmitting backup information in the backup buffer into the data register of the flash memory device so as to write the backup information from the data register into at least one different storage unit of the memory cell array of the flash memory device, in response of a reception of a second write record command signal which is sent from the flash memory controller and sequentially comprises a second prefix command, the write command, the address information, and the write record confirm command that is different from the normal write confirm command.

15. A method of a flash memory device to be used in a storage device and coupled to a flash memory controller of the storage device through a specific communication interface, the flash memory device comprising an input/output (I/O) control circuit, a command register, an address register, a memory cell array at least having a first plane and a second plane, wherein the second plane is different from the first plane, at least one address decoder, and a control circuit having a specific buffer, and the method comprises:

buffering command information of a command signal, sent from the flash memory controller and transmitted through the I/O control circuit, into the command register;

buffering address information of the command signal, sent from the flash memory controller and transmitted through the I/O control circuit, into the address register; and controlling the specific buffer storing a transmission history information of the specific communication interface;

wherein the transmission history information comprises at least one of a data content and a data type of the command information buffered in the command register, a data content and a data type of the address information buffered in the address register, and a data type of a data input/output operation executed by the flash memory device.

16. The method of claim 15, wherein the step of controlling the specific buffer storing the transmission history information comprises:

using a format of a data word to store a data content and a data type of the transmission history information;

wherein a first byte in the data word is used to store and indicate the data content while a second byte in the data word is used to store and indicate the data type which is a command type, an address type, a data-in type, or a data-out type.

17. The method of claim 15, wherein the data input/output operation executed by the flash memory device comprises at least one of a read status operation requested by the flash memory controller, a data read operation, and a data write operation.

18. The method of claim 15, further comprising:

controlling the specific buffer transmitting a copy of the transmission history information buffered in the specific buffer into a data register of the flash memory device so as to write and record the transmission history information from the data register into at least one storage unit of the memory cell array of the flash memory device.

19. The method of claim 18, further comprising:

transmitting the copy of the transmission history information and a current pointer position of the specific buffer into the data register so as to write the copy of the transmission history information and the current pointer position from the data register into the at least one storage unit of the memory cell array of the flash memory device, in response to a reception of a write record command signal which is sent from the flash memory controller and sequentially comprises a write command, a specific address information, and a write record confirm command; the current pointer position of the specific buffer is an index position of a last one recorded data word stored by the specific buffer.

20. The method of claim 19, further comprising:

further generating and transmitting an inverted data version of the copy of the transmission history information with the current pointer position of the specific buffer into the data register so as to further write the inverted data version from the data register into the at least one storage unit of the memory cell array of the flash memory device.

21. The method of claim 18, further comprising:

controlling the specific buffer transmitting the copy of the transmission history information buffered in the specific buffer into the data register of the flash memory device to write the transmission history information from the data register into multiple storage units disposed in multiple different planes of the memory cell array of the flash memory device, in response to a reception of a specific multi-plane write record command signal which is sent from the flash memory controller and sequentially comprises a write command, a specific address information, and a multi-plane write record confirm command that is different from a normal write confirm command and a write record confirm command.

22. The method of claim 15, further comprising:

controlling the specific buffer outputting the transmission history information into the I/O control circuit of the flash memory device to make the I/O control circuit transfer the transmission history information to the flash memory controller through the specific communication interface in response to a reception of a read record command signal which is sent from the flash memory controller and sequentially comprises a read parameter command and a read record address.

23. The method of claim 15, further comprising:

controlling the specific buffer outputting the transmission history information into the I/O control circuit of the flash memory device one data word by one data word from a next pointer position of the specific buffer into a current pointer position, and the current pointer position is an index position of a last one recorded data word stored by the specific buffer while the next pointer position is an index position next to the current pointer position.

24. The method of claim 15, further comprising:

controlling the specific buffer outputting multiple copies of the transmission history information into the I/O control circuit of the flash memory device to make the I/O control circuit transfer the transmission history information for multiple times to the flash memory controller through the specific communication interface.

25. The method of claim 15, further comprising:

generating an inverted data version of the transmission history information and transmitting at least one set of the transmission history information with the inverted data version of the transmission history information to the I/O control circuit of the flash memory device to make the I/O control circuit transfer at least one set of the transmission history information with the inverted data version of the transmission history information for at least one time to the flash memory controller through the specific communication interface;

wherein a hexadecimal value of a data byte in the inverted data version of the transmission history information is obtained by inverting a hexadecimal value of a corresponding data byte of the transmission history information.

26. The method of claim 15, wherein the control circuit further comprises a backup buffer, and the method further comprises:

storing the transmission history information, buffered in the specific buffer, and information of an index position of a latest one data word, stored by the specific buffer, into the backup buffer, in response to a reception of a backup record command signal which is sent from the flash memory controller and sequentially comprises a buffer backup command and a backup confirm command.

27. The method of claim 26, further comprising:

controlling the backup buffer outputting backup information in the backup buffer into the I/O control circuit of the flash memory device to make the I/O control circuit transfer the backup information to the flash memory controller through the specific communication interface in response to a reception of a read backup record command signal which is sent from the flash memory controller and sequentially comprises a read parameter command and a read backup record address.

28. The method of claim 26, further comprising:

controlling the specific buffer transmitting a copy of the transmission history information buffered in the specific buffer into a data register of the flash memory device so as to write the transmission history information from the data register into at least one storage unit of the memory cell array of the flash memory device, in response of a reception of a first write record command signal which is sent from the flash memory controller and sequentially comprises a first prefix command, a write command, address information, and a write record confirm command that is different from a normal write confirm command; and controlling the backup buffer transmitting backup information in the backup buffer into the data register of the flash memory device so as to write the backup information from the data register into at least one different storage unit of the memory cell array of the flash memory device, in response of a reception of a second write record command signal which is sent from the flash memory controller and sequentially comprises a second prefix command, the write command, the address information, and the write record confirm command that is different from the normal write confirm command.

\* \* \* \* \*